(12) United States Patent
Sathaye et al.

(10) Patent No.: US 11,645,190 B1
(45) Date of Patent: May 9, 2023

(54) COMPLIANCE CHECK CODE GENERATION FOR IMPLEMENTED PRODUCT CODE FROM A CODIFIED USER EXPERIENCE DESIGN

(71) Applicant: Dell Products, L.P., Hopkinton, MA (US)

(72) Inventors: Sumedh Sathaye, Austin, TX (US); Jennifer Minarik, Zionsville, IN (US); Patrick East, Arvada, CO (US); Reut Kovetz, Tel Aviv (IL); Kelly Lisai, Austin, TX (US); Jehuda Shemer, Kfar Saba (IL)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/719,608

(22) Filed: Apr. 13, 2022

(51) Int. Cl.
*G06F 9/44* (2018.01)
*G06F 11/36* (2006.01)
*G06F 9/448* (2018.01)
*G06F 8/41* (2018.01)

(52) U.S. Cl.
CPC .......... *G06F 11/3608* (2013.01); *G06F 8/427* (2013.01); *G06F 9/4498* (2018.02)

(58) Field of Classification Search
None
See application file for complete search history.

(56) References Cited

U.S. PATENT DOCUMENTS

| | | | |
|---|---|---|---|
| 10,698,803 B1* | 6/2020 | Mani | G06F 11/3684 |
| 2014/0372985 A1* | 12/2014 | Levin | G06F 11/3608 717/126 |
| 2018/0285246 A1* | 10/2018 | Tuttle | G06F 11/3664 |
| 2021/0117313 A1* | 4/2021 | Geary | G06F 11/3495 |

FOREIGN PATENT DOCUMENTS

WO    WO 2021016468    *    1/2021

* cited by examiner

*Primary Examiner* — Insun Kang
(74) *Attorney, Agent, or Firm* — Anderson Gorecki LLP

(57) ABSTRACT

An automated system automatically creates compliance checking code that is used to test the functional aspects of implemented product code. Intermediate code blocks are created that are then written into compliance checking code, to enable automatic creation of compliance checking scripts designed to test the implemented product code for compliance with persona, outcome, states and state transitions, consistency rules, and annotations specified by the codified user experience design.

20 Claims, 16 Drawing Sheets

Example Experience Definition

Code generation

Visual Testing

Automated compliance checking code generation system

FIG. 11 Compliance check code generation

Outcome checker logic generation

FSM checker logic generation

Consistency checker logic generation

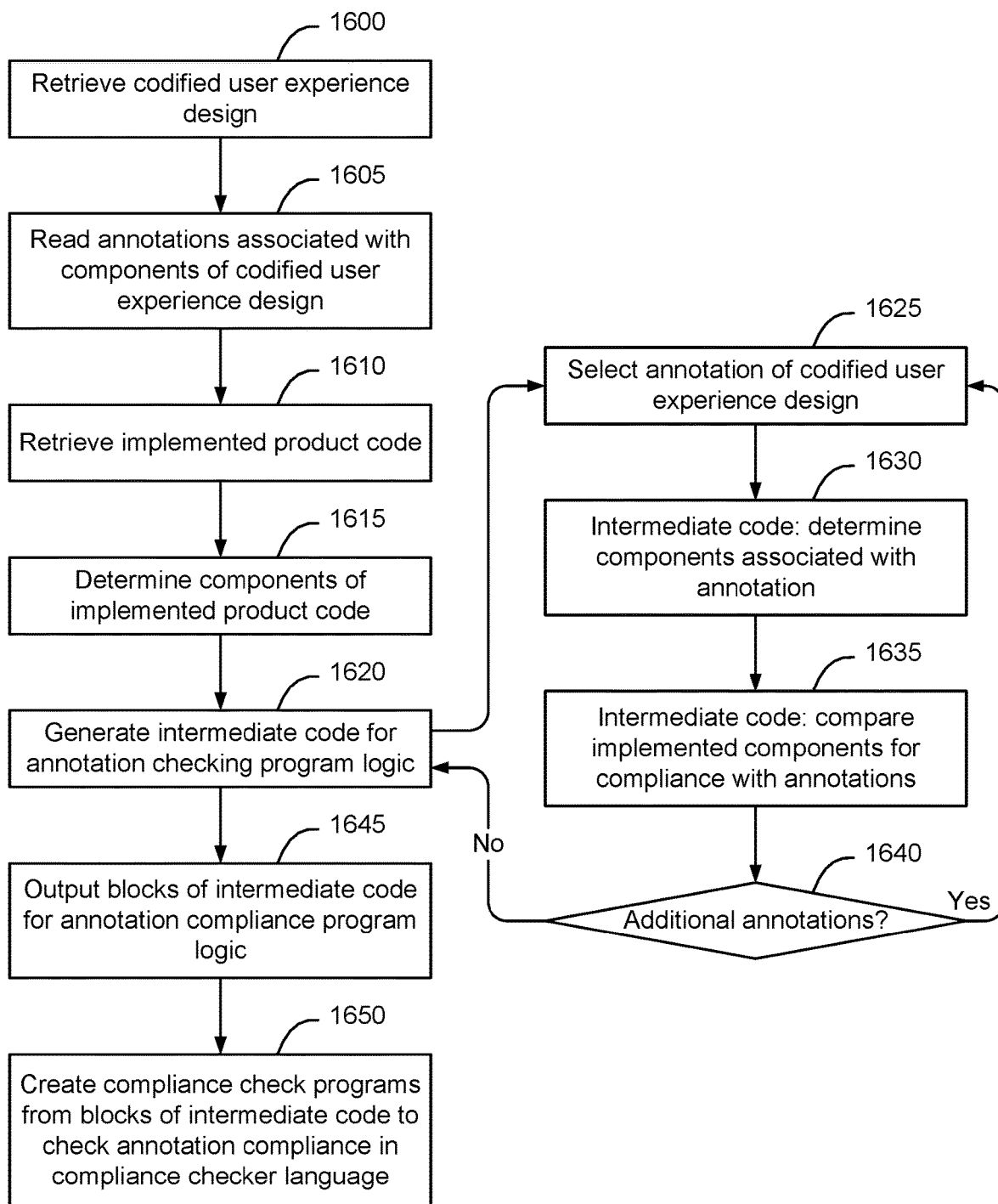

COMPLIANCE CHECK CODE GENERATION FOR IMPLEMENTED PRODUCT CODE FROM A CODIFIED USER EXPERIENCE DESIGN

FIELD

This disclosure relates to computing systems and related devices and methods, and, more particularly, to a method and apparatus for generating compliance check code for implemented product code from the codified user experience design.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

An automated system is provided to automatically create compliance checking code that is used to test the functional aspects of the implemented product code. Intermediate code blocks are created that are then written into compliance checking code, to enable automatic creation of compliance checking scripts designed to test the implemented product code for compliance with persona, outcome, states and state transitions, consistency rules, and annotations specified by the codified user experience design.

BRIEF DESCRIPTION OF THE DRAWINGS

FIG. 16 is a flow chart of an example process of automated generation of compliance checking code related to compliance of implemented product code with annotations specified by a codified user experience design, according to some embodiments.

DETAILED DESCRIPTION

Figure 1:
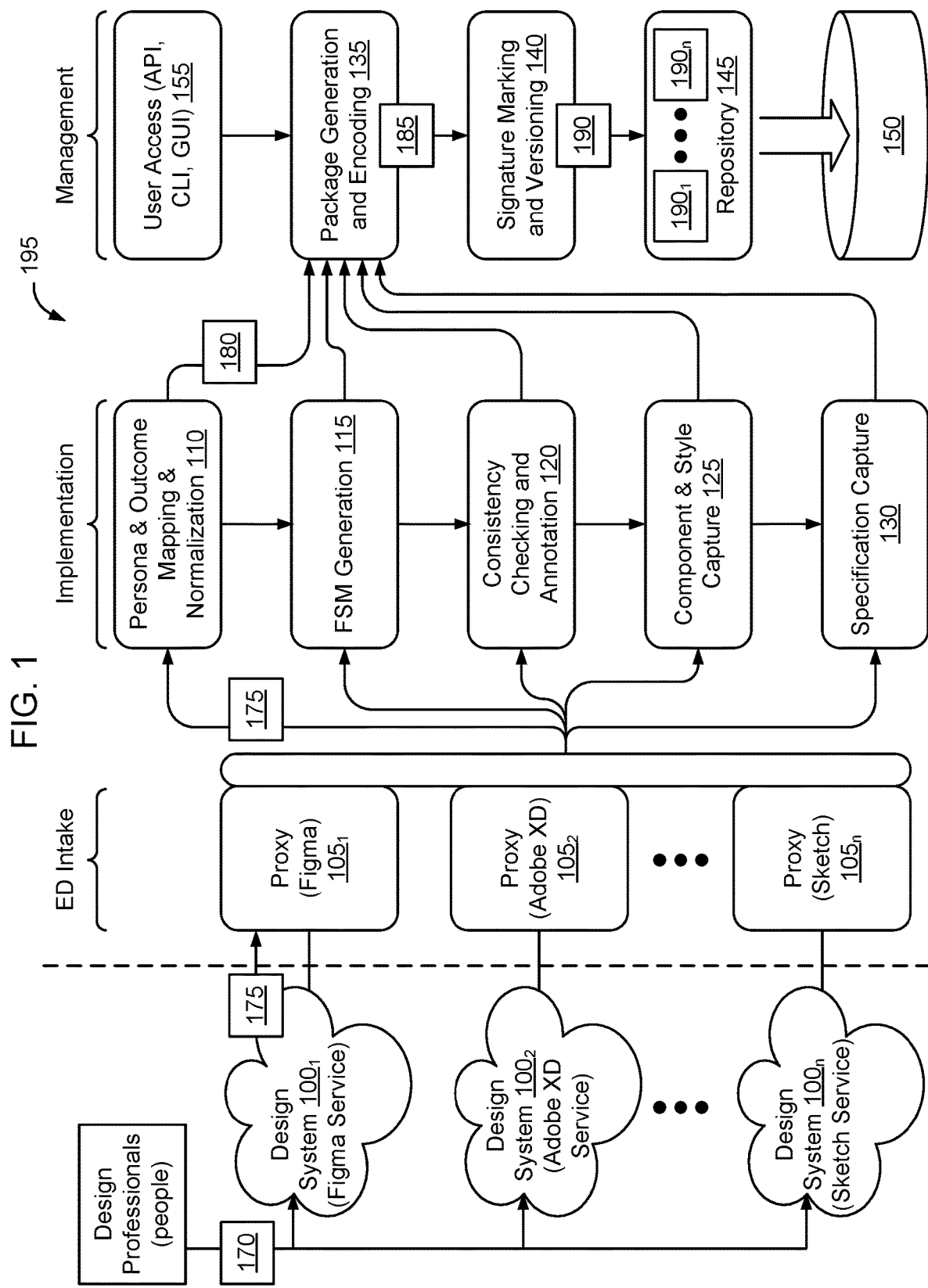
FIG. 1 is a functional block diagram of an example Experience Design Codification and Management System (EDCMS) interfaced with external user experience design systems, according to some embodiments.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Storage systems are used to provide storage services for host applications. When a host application wants to have data stored on a given storage system, the necessary storage volumes are created on the storage system by interacting with a user interface to the storage system. Humans can interact with the storage system, and likewise other automated processes can interact with the storage system.

Any interaction, whether it be between a human actor and a machine such as a storage system, or between two computer implemented systems, constitutes a "user experience" with a product. User experience design is the process of supporting user behavior through usability, usefulness, and desirability provided in the interaction with a product. Although an example system for codifying user experience designs and managing the codified user experience designs will occasionally be described in the context of codifying and managing user experience designs that are configured to enable users and storage systems to interact, it should be understood that embodiments may be used in many contexts, and are not limited to use in the context of codifying and managing user experience designs in the context of a storage system.

An example of a user experience design might be, for example, a Graphical User Interface (GUI) component or set of screens that are configured to enable a user to access a particular feature on a storage system. User experiences are designed, for example using design systems 100, to enable the graphical user interface to be used to achieve a particular objective. In the context of a GUI that is used to interface a software program, the term "user experience design", as used herein, is used to refer to a set of graphic components and transitions between states that enable a user to navigate, through the GUI, to enable the user to access the intended feature of the software program. In the context of a CLI, the term "user experience design" is used to refer to a selected set of scripts that are arranged in a package, in which each package contains an ordered set of API calls and input parameters, that are arranged to enable the user to access the intended objective. In the context of an API, the term "user experience design" is used to refer to a selected set of files that are arranged in a playbook, in which each file contains an ordered set of API calls and input parameters, that enable the user to access the intended objective.

Conventionally, user experience designs would be created by experience designers. For example, if a new feature is to be added to a software product, and the software product has a graphical user interface (GUI), often the GUI will need to be modified to enable the users to access the new feature of the software product. Stated differently, a new user experience will need to be created (designed) to enable the user to access the new feature of the software product. To create the new user experience, a software interaction design professional would create a version of how the GUI may be configured, to enable a person to access the new feature through the software product's GUI. The initial version of the changes to the GUI might be created by the design professional using a design tool such as Figma, Adobe XD, Sketch, or by manually diagramming the GUI experience.

The user experience design would then be reviewed by the design professionals, the product managers responsible for enabling the new feature in the software product, the product architects responsible for designing and including the new feature in the software product, and engineers responsible for actually implementing the GUI from the mockup provided by the design professional. After agreeing on the details of the user experience design, the engineers would implement the user experience design in software to add the user experience design to the software product GUI. The GUI would then be tested to ensure that the new feature of the product is actually accessible via the GUI. Often this process would iterate multiple times from any stage back to the original design phase, which can cause delays in implementing new features in the software product. Additionally, where the new feature is intended to be accessed using multiple different user experience designs, such as by a CLI as well as a GUI, each of the user experience design would need to go through this process.

Moreover, the conventional process of creating user experience designs is a manual process that requires each participant to keep track of the latest version of the user experience design. In an environment where the user experience design is changing frequently, for example due to architecture changes, implementation approach changes, or due to market/customer requirement changes, this may be difficult to implement. For example, the design professionals and product development team may revise a user experience design, but the engineers tasked with implementing the user experience design may be working on an earlier version of the user experience design.

In related U.S. patent application Ser. No. 17/277,542, filed Jan. 18, 2022, entitled Method and Apparatus for Codifying User Experience Designs and Managing the Codified User Experience Designs, an Experience Design Codification and Management System (EDCMS) system is described. The content of U.S. patent application Ser. No. 17/277,542 is hereby incorporated herein by reference.

Specifically, U.S. patent application Ser. No. 17/277,542, describes a method and apparatus that is configured to retrieve a user experience definition 175 based on the user experience design from an external design system 100, and generate a comprehensive user experience specification 180 from the user experience definition 175. Part of the comprehensive user experience specification 180 includes HTML, JavaScript and Cascading Style Sheets (CSS) describing the graphical aspects of the user experience design, as well as JavaScript Object Notation (JSON), eXtensible Markup Language (XML) or YAML code created based on the finite state machine generated from the user experience definition 175. The EDCMS 195 then packages and encodes the comprehensive user experience specification to create a codified user experience design 185 from the comprehensive user experience specification 180. The codified user experience design 185 is then versioned and digitally signed, and the versioned and signed codified user experience design 190 is stored in a user experience design repository 145.

By automatically generating a codified user experience design 185 from a user experience design 170, it is possible to provide engineers with a codified version of the intended user experience design 170, which includes HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented. This eliminates communication errors that might occur between the design professionals and engineers, because the engineers are automatically provided with a packaged and encoded codified user experience design 185, that is generated from the user experience design 170. By signing and versioning the codified user experience specification 190, and automatically entering the signed and versioned codified user experience 190 in a user experience design repository 145 where it can then be checked out/checked in, as necessary, it is possible to ensure that everyone is working to implement the correct version of user experience design 170. This facilitates collaboration by preventing different members of the design team from working toward implementation of different versions of the user experience design 170.

FIG. 1 is described in greater detail in U.S. patent application Ser. No. 17/277,542, and is a functional block diagram of an example Experience Design Codification and Management System (EDCMS) 195, according to some embodiments. As shown in FIG. 1, in some embodiments design professionals (people) use existing experience design tools 100 to create user experience designs 170. Example existing design tools include design systems $100_1$-$100_n$, which might be for example an online design system tool such as Figma $100_1$, Adobe XD $100_2$, or a Sketch $100_n$. Many external design systems 100 might be used, depending on the implementation. Additionally, in some embodiments, user experience designs may be created manually, i.e., without the help of tools such as Figma or Adobe XD, and then processed by a proxy 105 configured to perform image processing of the manually created design. It should be noted that the design systems $100_1$-$100_n$, are outside of the EDCMS 195, as indicated by the vertical dashed line separating the external design systems 100 from the components of the EDCMS 195.

In some embodiments, the EDCMS 195 includes an experience design intake section configured to interact with the design systems $100_1$-$100_n$, to retrieve user definitions 175 based on the user experience designs 170 that have been created by the design professionals using these external systems 100. For example, in some embodiments the EDCMS 195 includes a set of proxies $105_1$-$105_n$ configured to interact with each respective design system $100_1$-$100_n$. As an example, if the Figma Service (design system $100_1$) enables external access at a particular URL, the Figma proxy $105_1$ may be configured to access the external Figma Service URL, request a design created by a particular design professional or team of design professionals, and then download the requested user experience definition 175. In some embodiments, each proxy operates in a stateless manner, and makes use of publicly available API interfaces for the experience design platforms 100. Although FIG. 1 shows a one-to-one correspondence between proxy 105 and design system 100, it should be understood that in some embodiments a given proxy 105 may be configured to interact with more than one design system 100, or that a single proxy 105 may be used to interact with all of the design systems 100.

According to some embodiments, the EDCMS 195 is configured to require the design professional to include experience metadata 250 (see FIG. 2) describing the intended environment of the software interaction experience.

The experience metadata 250, in some embodiments, includes information about who (the persona 205) the software interaction experience is being designed for. Different types of software users (different personas) might be provided with different software interaction experiences. For example, a system administrator may be given a different set of experiences than a normal user. Other personas might be a data center manager, network manager, software engineer, or other similar title. Personas may also be specified by capturing what the roles do, such as server administrator, storage administrator, backup administrator, filesystem user, auditor, security administrator, etc. In addition to specifying the persona 205, in some embodiments the experience metadata 250 also includes information about when, in the product lifecycle 210, the person specified in the persona metadata 205 is expected to encounter the software interaction experience.

In some embodiments, the experience metadata 250 includes information about the intended outcome of the user experience design 170. An "outcome", as that term is used herein, is used to refer to the objective of the software interaction experience. For example, if the software interaction experience has been created to enable a user to create a storage volume on a storage system, that would be the "outcome" that the design professional would specify in the outcome 215 aspect of the experience metadata 250. Other outcomes might include initial configuration of a system, setting up sub-tenants on a leased storage system, creating and mapping Logical Unit Numbers (LUNS) to hosts, monitoring system behavior, creating custom dashboards, etc. Many possible outcomes exist, although it would also be expected that there would be many similar outcomes that design professionals would create for different software products.

In some embodiments, the experience metadata 250 includes information about the particular mode of consumption 220, i.e., how a user is to be presented with the software interaction experience. Example modes 220 might include a Graphical User Interface (GUI) such as on a browser or on a mobile application, an Application Program Interface (API), a Command Line Interface (CLI), a Continuous Integration/Continuous Delivery (CI/CD) system, or another form or mode of consumption of a user experience.

In some embodiments, the experience metadata 250 includes information about how the experience is achieved. This is the workflow 225 that is used to achieve the intended outcome. For a GUI based user experience design 170, the workflow specifies the human interaction with screen states and transitions between states.

Figure 2:
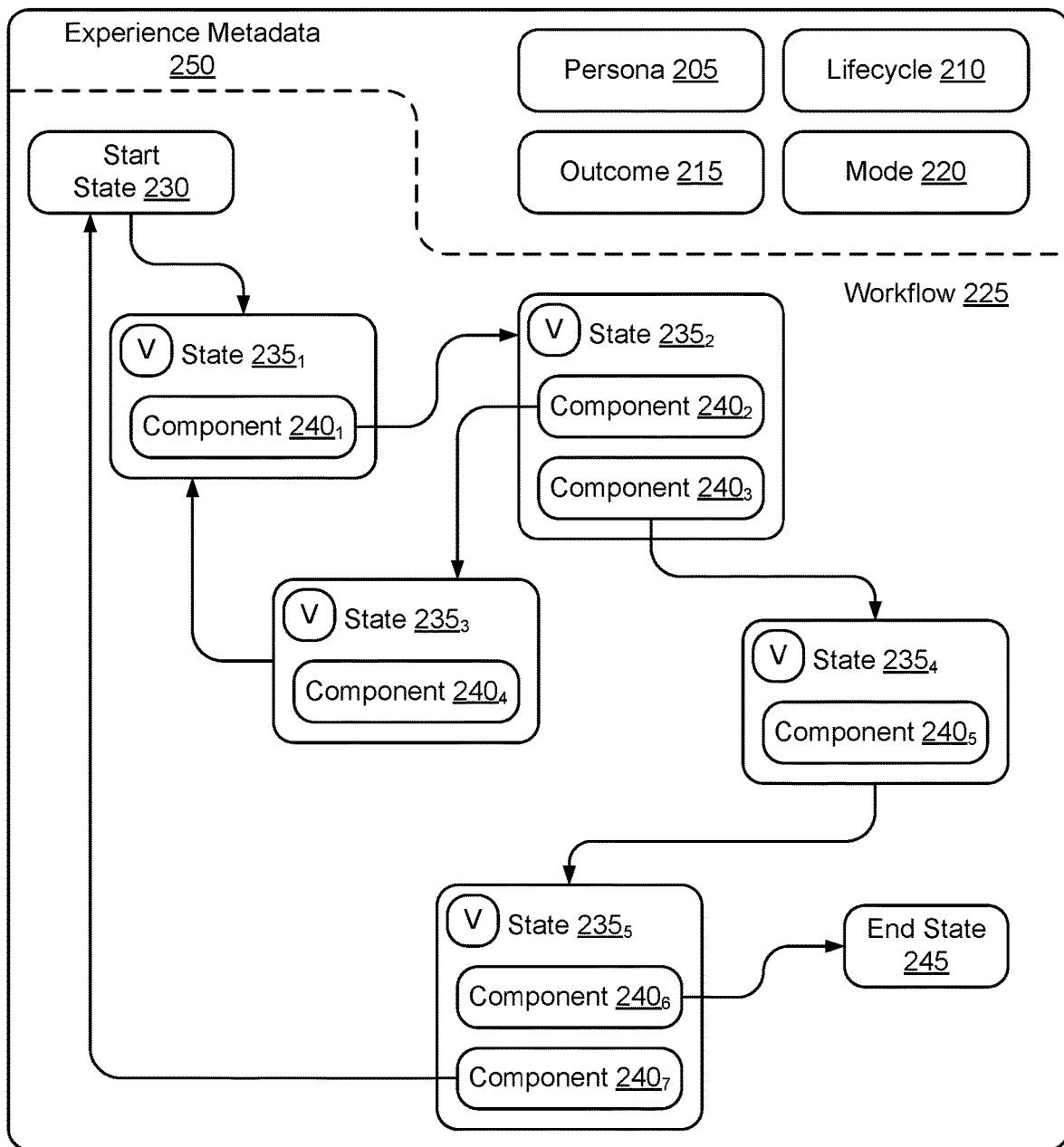
FIG. 2 is a functional block diagram of example experience design metadata, according to some embodiments.

FIG. 2 is a functional block diagram of example experience design metadata 250, according to some embodiments. As shown in FIG. 2, in some embodiments the user experience definition 175 metadata 250 includes the persona 205, lifecycle 210, outcome 215, and mode of consumption 220. In addition, the user experience definition 175 metadata 250 includes workflow metadata 225 specifying a series of states 230, transitions between states, components 240, and variability information (V).

In the example workflow 225 shown in FIG. 2, the workflow metadata 225 specifies a start state 230 and a subsequent transition to state $235_1$. In the context of a GUI, the start state might be encountered when the user starts the software application and state $235_1$ might be displaying an initial screen on the GUI that includes component $240_1$. The workflow metadata 225 specifies that, when the user interacts with component $240_1$, that the experience should transition to state $235_2$ containing components $240_2$ and $240_3$. The workflow metadata 225 further specifies state transitions that occur in connection with each of the components until an end state 245 is reached. In some embodiments, the end state 245 is associated with the outcome 215. Although FIG. 2 shows an example in which the workflow metadata 225 has one end state 245, it should be understood that there may be more than one end state 245, depending on the implementation. It should be understood that the example shown in FIG. 2 is merely one example of an experience design metadata, and it would be expected that different experience designs could vary considerably from the example shown in FIG. 2. Additionally, while FIG. 2 shows the example workflow in the form of a graph, the workflow may also be specified in a textual manner, for example in a plain text language file.

Once the user experience design 170 has been created, the EDCMS 195 accesses and obtains a copy of the user experience design 170 from the design system 100. As used herein, the term "user experience definition 175" is used to refer to a set of one or more files that are associated with the user experience design 170, and which are retrieved by the EDCMS 195 from the external design system 100 after the user experience design 170 has been created on the external design system 100. The particular format of the files which comprise the user experience definition 175 will depend on the syntax used by the external design system 100 to describe the user experience design 170. In some embodiments, when the user experience definition 175 is retrieved by the EDCMS 195, the EDCMS checks for the presence of the required experience metadata 250 and, if any user experience metadata 250 is missing, prompts are generated via user access interface 155 to request that the experience metadata 250 be added to the user experience definition.

In some embodiments, the implementation layer processes the user experience definition 175 to create a comprehensive user experience specification 180. The implementation layer, in some embodiments, includes a persona and outcome mapping and normalization subsystem 110, a finite state machine (FSM) generation subsystem 115, a consistency checking and annotation subsystem 120, a component and style capture subsystem 125, and a specification capture subsystem 130. Although FIG. 1 shows the user experience definition 175 being input to the persona and outcome mapping and normalization subsystem 110, it should be understood that the user experience definition 175 may be simultaneously input to each of the subsystem 110, 115, 120, 125, 130 at the same time. Likewise, although FIG. 1 shows arrows extending between the subsystem 110, 115, 120, 125, 130 from top to bottom, it should be understood that the subsystems may be used in any order, and that the subsystems may process the user experience definition 175 independently, depending on the implementation.

In some embodiments, the outcome mapping and normalization subsystem 110 captures the target persona from persona metadata 205 and the target outcome from outcome metadata 215 and translates the persona 205 and outcome 215 into a standard taxonomy of personas and outcomes. For example, if the target persona specified in persona metadata 205 of the user experience definition 175 was "sys admin", and the standard taxonomy included "system administrator" as one of the standard personas, the outcome mapping and normalization subsystem 110 would change the experience metadata 250 such that the experience metadata 250 in the comprehensive user experience specification 180 referred to the intended persona using the term "system administrator". In some embodiments, the persona and outcome mapping and normalization subsystem 110 uses data and textual analytic techniques to implement the mapping and normalization of persona metadata 205 and outcome metadata 215.

In some embodiments, the finite state machine generation subsystem 115 uses the knowledge of the start state 230, incrementally captures state transition events and actions, incrementally captures the contents of each state, and incrementally captures the variable/invariable nature of each state. In some embodiments, the finite state machine generation subsystem 115 uses the workflow metadata 225 to build a Mealy machine, in which state transitions depend on the current state plus inputs, or a Moore machine, in which state transitions do not depend on the inputs, but only depend on the current state, and produces a formal, intermediate representation of a finite-state machine. In some embodiments, the finite state machine generation subsystem 115 also runs one or more sanity checks on the finite state machine, to ensure that the finite state machine meets a set of pre-requisite properties for experience designs. Example sanity checks might include a set of Boolean rules, such as "before a page loads, x event is required to happen."

The consistency checking and annotation subsystem 120, in some embodiments, determines which elements of the user experience definition 175 are variable, and which are absolutely required, and annotates the comprehensive user experience specification 180 to indicate which elements are able to be varied by the engineers when implementing the comprehensive user experience specification 180. For example, in FIG. 2, each state has a variability V specified, which indicates whether and to what extent the particular state is variable or whether any of the components of the state are variable. An example variability measure may be to specify that the particular color that was selected is variable, such that the component or the state may be adjusted to automatically use one of a standard set of colors. Another example variability measure may be to allow for some latitude as to the particular placement of the component on the interface design. The consistency checking and annotation subsystem 120, in some embodiments, uses this variability information as well as heuristics, to annotate which aspects of the design are variable and by what percentage or other quantity the aspect may be varied in the final user experience. In some embodiments, the consistency checking and annotation subsystem 120 uses the same process to also check the styles of each of the states, to determine whether the styles used in each of the states are variable. Style consistency and annotation can be implemented for each state as well, and can be implemented at the same time as the components are processed by the consistency checking and annotation subsystem 120 or can be processed separately from the components.

The component and style capture subsystem 125, in some embodiments, conducts either a depth-first or breadth-first walk of the finite state machine graph, marking visited states along the way, to identify all components of the finite state machine. The component and style capture subsystem 125 compares the components used in the finite state machine with a store of known components in database 150 and, if a new component is detected that is not contained in the store of known components, adds the new component to the store of known components. In this manner, a store of known components can be incrementally built over time by the EDCMS 195. In some embodiments, the data store of known components is used by the consistency checking and annotation subsystem 120 (described above) when checking components of a user experience definition 175 for consistency with previous versions of the same components. Components in the data store of known components may be indexed, within the namespace of the experience at hand, as well as by its version, signature, and other unique fields, depending on the implementation. In some embodiments, if a component or style in the experience definition matches a known component or style in the data store of known components or styles, the correspondence is noted in the comprehensive user experience specification.

In some embodiments, the EDCMS 195 includes a specification capture engine 130. In some embodiments, this subsystem is configured to convert all parts of the comprehensive user experience specification 180, from the persona and mapping normalization subsystem, the finite state generation subsystem 115, the consistency checking and annotation subsystem 120, and from the component and style capture subsystem 125, into a standard versioned stylized, codified specification. The specification, in some embodiments, is expressed in human-readable and machine-readable languages and includes, for example, HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

In some embodiment, a package generation and encoding subsystem 135 encodes the comprehensive user experience specification 180 as well as artifacts received from each of the implementation subsystems. In some embodiments, the package generation and encoding subsystem 135 operates in a request/response manner with each of the subsystems 110, 115, 120, 125, 130, to capture partial results and store the partial results in database 150. The package generation and encoding subsystem 135 also packages the comprehensive user experience specification 180 to enable all aspects of the comprehensive user experience specification 180 to be included in the codified user experience design 185.

In some embodiments a signature marking and versioning subsystem 140 receives the comprehensive user experience specification 180 and signs and versions the comprehensive user experience to create a versioned and signed codified experience specification. In some embodiments, the signature is implemented using a hash to create a digital signature that is virtually guaranteed to be universally unique. An example hash might be implemented, for example, using a Secure Hash Algorithm such as SHA-256, which creates a 32-byte hash signature. Other hash algorithms may similarly be used, depending on the implementation. In some embodiments the versioning process assigns a version number to the versioned and signed codified experience specification 190 to enable each version of a given user experience design to be specifically identified. Example version number might be 1.1, 1.2, 1.2.1, etc., depending on the implementation. In some embodiments, the user is prompted to provide input as to how the user experience design should be versioned. The package, its signature, and its version identifier, constitute a unique artifact for a particular experience design. Any future change to the design will result in a new signature and a new version number, to enable all versions of the user experience design to be uniquely identified within the user experience design repository 145.

Figure 3:
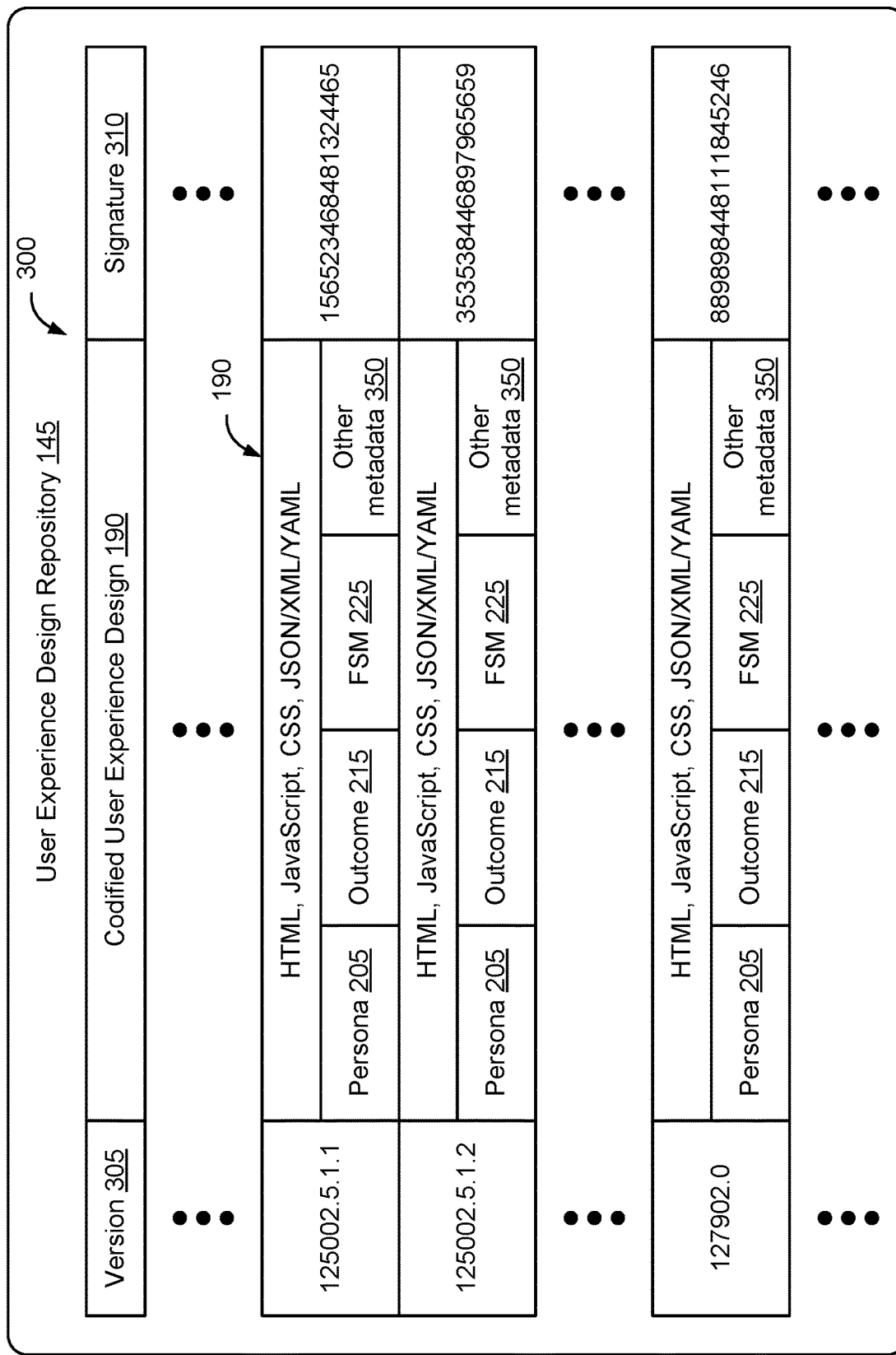
FIG. 3 is a functional block diagram of an example data structure configured to implement a codified user experience design repository of the EDCMS of FIG. 1, according to some embodiments.

Codified user experience designs 190, in some embodiments, are stored in a user experience design repository 145. FIG. 3 is a functional block diagram of an example data structure configured to implement a user experience design repository 145 of the EDCMS of FIG. 1, according to some embodiments. As shown in FIG. 3, in some embodiments the user experience design repository 145 includes a data structure 300 having entries containing versioned and signed codified experience specifications 190. Each entry has a version number 305 that uniquely identifies the experience specification 190 and a signature 310 that is able to be used to verify the content of the experience specification 190. The user experience specification includes the experience metadata 225, such as persona 205, outcome 214, finite state machine 224, annotations, and the other experience metadata described in connection with FIG. 2. The user experience specification also includes the HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

As discussed in greater detail herein, in some embodiments the EDCMS includes an automatic template and logic generator 400 configured to use the codified user experience design and generate a full, versioned pattern implementation in a web framework such as Angular, React, Vue, or micro frontend of the user experience design 170 that is to be implemented. In some embodiments, the finite state machine is used to define a pattern for the software, to generate JSON, XML, or YAML code specifying the states of the software and the transitions between states. Objects encountered at the states are used to identify API calls, which are built at the object location in the user experience design. The API calls are also aggregated to build a backend layer, to thereby automatically build both a front-end layer and back-end layer based on the codified user experience design.

Figure 4:
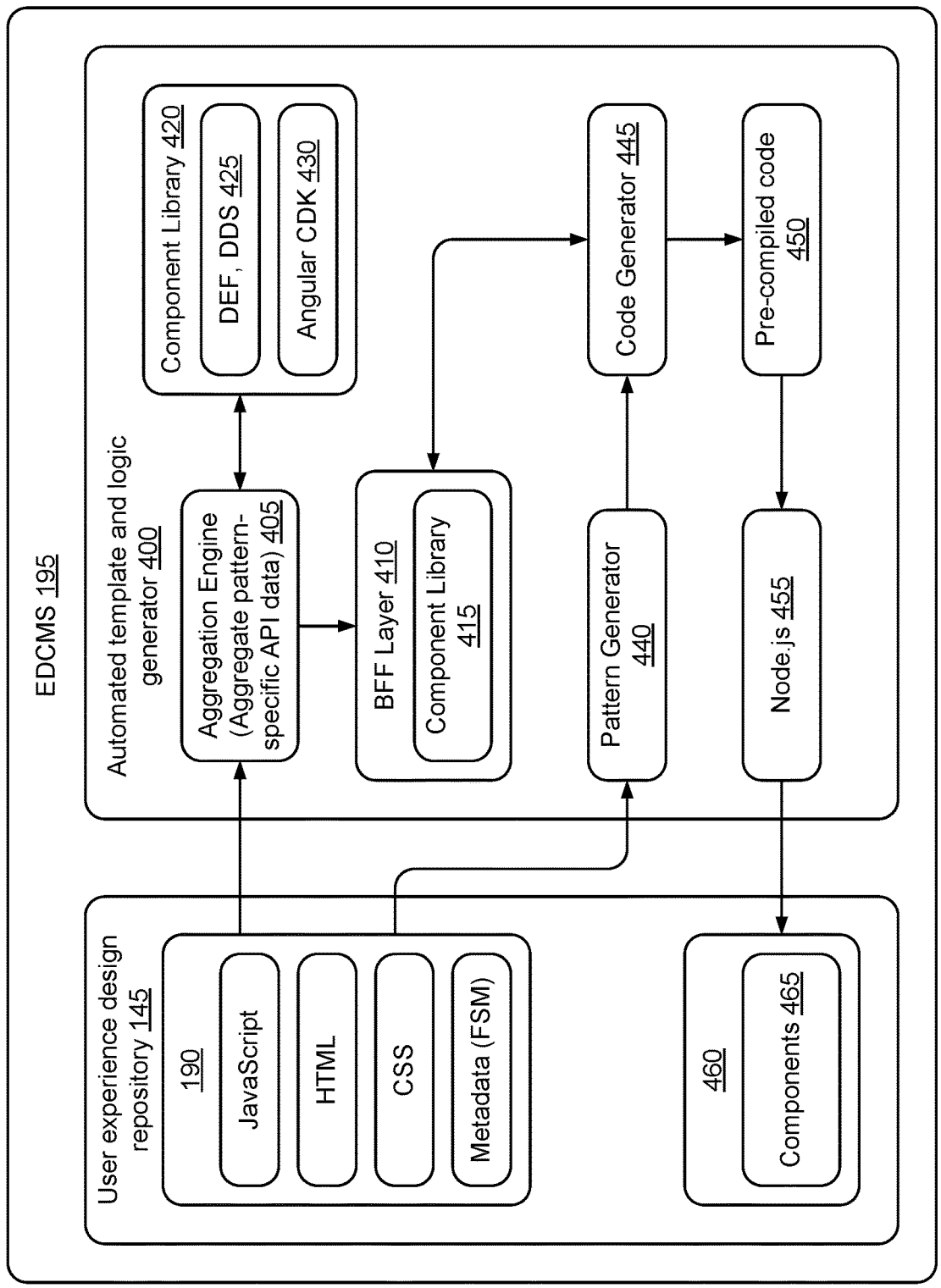
FIG. 4 is a functional block diagram of an example EDCMS system configured to automate template and logic generation from a codified user experience design, according to some embodiments.

FIG. 4 is a functional block diagram of an example EDCMS system configured to automate template and logic generation from a codified user experience design, according to some embodiments. As shown in FIG. 4, in some embodiments the EDCMS 195 includes an automated template and logic generator 400 configured to build a Back-end for Front-end (BFF) layer 410 and configured to generate precompiled code corresponding to codified user experience design.

The codified user experience design specifies the graphical elements that a user interacts with to achieve the outcome associated with the user experience design. The user experience design also includes a finite state machine that specifies the transitions between states of the graphical interface, as the user selects particular options within the user experience design. However, the objects associated with the user experience design are not linked to particular functions when the user experience design is first created. Accordingly, although the user experience design specifies the user to click through the user experience and enter various pieces of information, the objects of the codified user experience design need to be linked to particular function calls to enable the codified user experience design to contain logic that can be used to enable the user experience design to be used to functionally interact with and control operation of an application. Additionally, a back-end layer needs to be built for the user experience design, to ensure that the back-end layer contains all the functionality required to enable the function calls to be executed on the underlying system. According to some embodiments, the automated template and logic generator 400 is configured to build both the back-end layer and the front-end layer to enable the user experience design to be used to functionally interact with and control operation of an application to achieve the outcome associated with the codified user experience design.

As shown in FIG. 4, in some embodiments the automated template and logic generator 400 includes an aggregation engine 405 configured to aggregate API data from a finalized user experience design and use the API data to build a BFF layer 410. A back-end layer is a layer that is used to enable a front-end to control operation of a device such as a storage system. The back-end layer must include an Application Programming Interface (API) for each function that the front-end wants to perform, to thereby enable the back-end to implement the correct functional call to the underlying hardware. Rather than building a back-end independent of the front-end, in some embodiments the back-end layer is built specifically for the front-end application that is to be used to interface with the underlying hardware. By building a back-end layer specific for the front-end layer e.g., a Back-end layer that was built for the front-end (Back-end For Front-end or BFF layer 410), it is possible to ensure that the back-end layer has all of the APIs required by the front-end remain consistent, thereby ensuring correspondence between the back-end and front-end layers.

According to some embodiments, the automated template and logic generator 400 includes an aggregation engine that receives a copy of the codified user experience design, walks the finite state machine to determine which API calls are made by the various components of the codified user experience design, and aggregates the API calls to generate a BFF layer 410.

Figure 5:
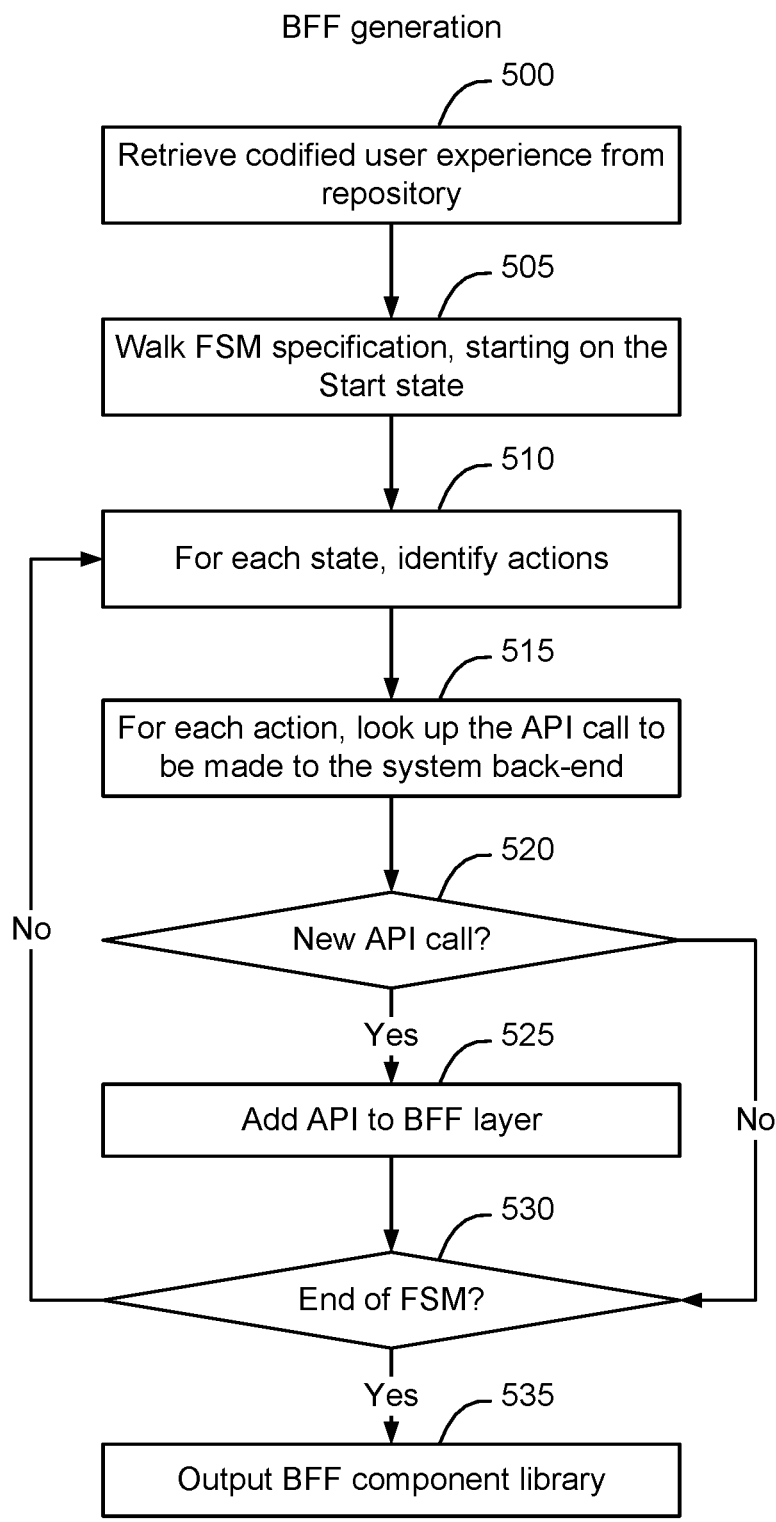
FIG. 5 is a flow chart of an example process of creating a Back-end For Front-End (BFF) layer from a codified user experience design, according to some embodiments.

FIG. 5 is a flow chart of an example process of creating a Back-end For Front-End (BFF) layer 410 from a codified user experience design, according to some embodiments. As shown in FIG. 5, in some embodiments the aggregation engine 405 retrieves the codified user experience design from the user experience design repository 145 (block 500). The codified user experience design includes a finite state machine, as well as a set of objects and annotations that specify actions at each state. Example actions might include, for example, a button click on an object, entry of a value of a parameter in a particular field, etc. In some embodiments, the aggregation engine 405 uses the object names and object annotations to identify objects present on the graphical experience design in the selected state, and uses the object names and object annotations to identify the actions associated with the state.

The aggregation engine 405 walks the finite state machine in a breadth first or depth first manner (block 505) to visit each state of the finite state machine, and identifies actions implemented in each of the states. The aggregation engine 405 marks each visited state, and continues visiting states of the finite state machine until all end states of the finite state machine have been reached. As objects are encountered, corresponding components are identified in a component library 420 and used to build a component library 415 for the BFF layer. Code generator 445 uses the component library 415 to build the front-end layer, which may be done separate from creation of the BFF layer or may be implemented concurrently with creation of the BFF layer.

As shown in FIG. 5, in some embodiments, for each state, the aggregation engine identifies the objects in that state, which are used to identify corresponding components from component library 420. The components define the actions that occur in that state (block 510). For each action, the aggregation engine looks up the API call that is required to be made to the system back-end to implement the action (block 515) and adds the corresponding API to the BFF layer. In some embodiments, when the aggregation engine 405 determines that there is an object associated with a state, the aggregation engine 405 identifies the component associated with the object in one of the libraries of the component library 420 and determines the API associated with the component that is required to be used implement the action associated with the object on the underlying system (block 515).

The component library, in some embodiments, contains one or more libraries. Example libraries might include a first library 425 based on the Dell Enterprise Framework (DEF), a second library 430 based on the Angular Component Development Kit (CDK) 430, and numerous other libraries. The component library 420 may include multiple component libraries depending on the implementation.

In some embodiments, when a design professional is creating a user experience design, the design professional will name the objects in the design using a naming convention that maps in a one-to-one manner to a particular component in one of the libraries contained in component library 420. For example, objects that are added to the codified user experience design may be named using a set of names specified in an experience design group. Example object names might be "masthead", "App Frame", "Side Navigation", "Status Bar", "DataGrid", "header", etc. Each of these object names corresponds on a one-to-one basis to a particular component in the component library 420. In some embodiments, annotations associated with the objects may also be used to select components that correspond with objects in the codified user experience design from the component library 420. When the aggregation engine determines that the codified user experience design contains a particular object, it maps the object name to the corresponding component. When the component requires implementation of a API call, the aggregation engine identifies the API call and adds the corresponding API to the BFF layer 410.

Although FIG. 4 shows the component library 420 as residing within the automated template and logic generator 400 for ease of illustration, it should be understood that the component library 420 might be maintained outside of the EDCMS 195 and outside of the automated template and logic generator, depending on the implementation.

A determination is then made as to whether the API is a new API, or whether the API has previously been added to the BFF layer 410 (block 520). If the API is a new API (a determination of YES at block 520) the API is added to the BFF layer 410 (block 525). If the API is not a new API (a determination of NO at block 520), the BFF layer 410 already includes the API, and the aggregation engine moves to the next state of the FSM. In some embodiments, the aggregation engine 405 walks the FSM in a breadth first or depth first manner, marking visited states, to aggregate APIs to create the BFF layer 410. Specifically, in some embodiments the aggregation engine determines if it has reached the end of the FSM (block 530). A determination that the aggregation engine 405 has reached the end of the FSM may be implemented, for example, by gathering all states, iterating through the states, marking each state visited, and determining when the aggregation engine 405 has marked all states of the FSM as visited. If the aggregation engine 405 has not processed all states of the FSM (a determination of NO at block 530), the aggregation engine 405 moves to a next state and continues building the BFF layer 410. If the aggregation engine has processed all states of the FSM (a determination of YES at block 530) the BFF layer 410 is complete and the process of building the BFF layer 410 ends.

In some embodiments, in addition to aggregating APIs to create the BFF layer 410, as objects are encountered and components are selected, the components are added to a component library 415 that is created for the BFF layer. The component library 415 thus includes a subset of components selected from the component library 420, which are known to be supported by the BFF layer 410.

Once the BFF layer 410 has been built, or while the BFF layer 410 is being built, the automated template and logic generator 400 also sets an architectural flow for the software that is to be created from the codified user experience design, and then builds the software based on the architectural flow. In some embodiments, the architectural flow of the software is based on the states and state transitions contained in the finite state machine.

Figure 6:
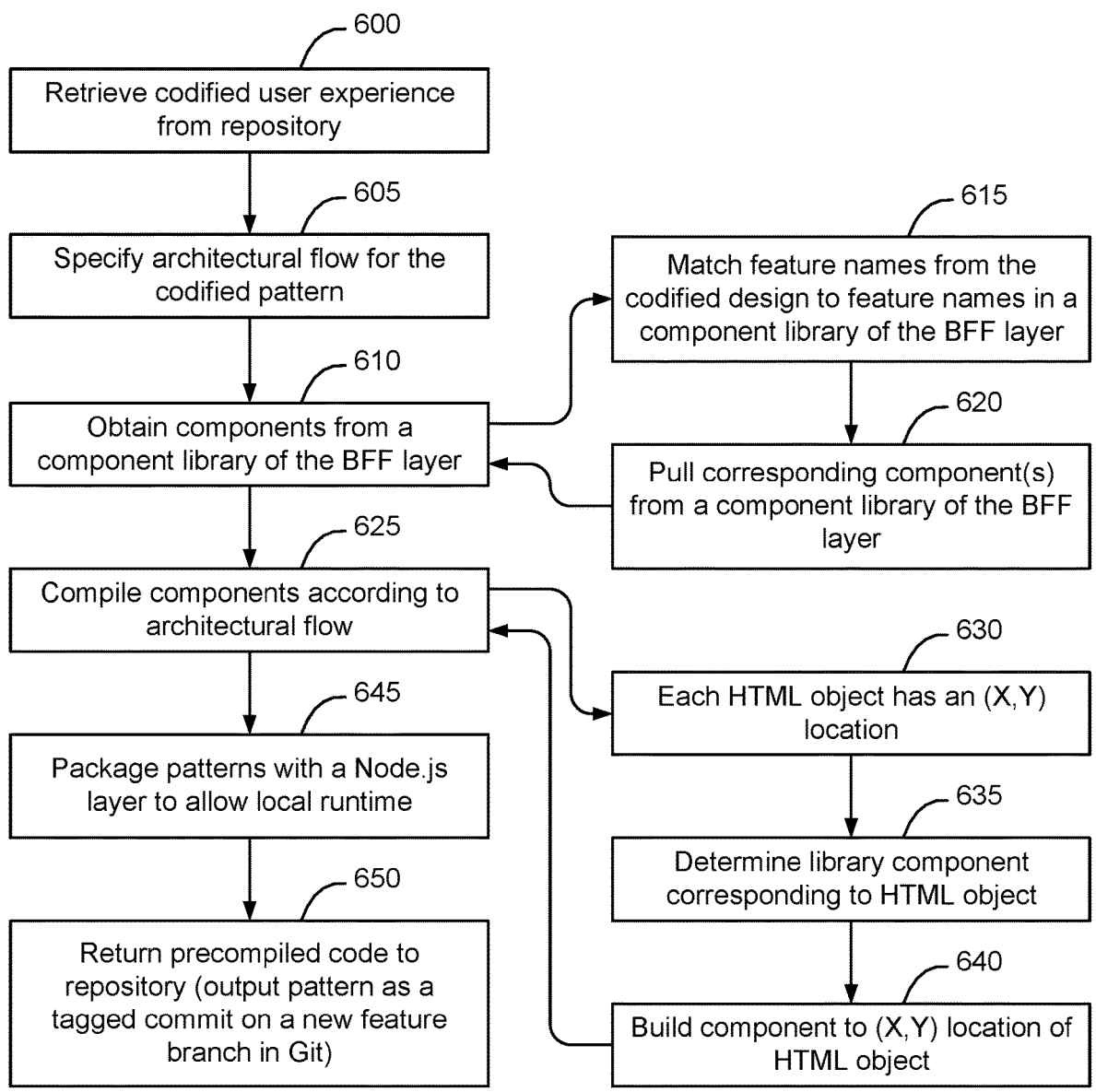
FIG. 6 is a flow chart of an example process of automating template and logic generation from a codified user experience design, according to some embodiments.

The process then continues to FIG. 6 in which the automated template and logic generator 400 creates a template for the codified user experience and uses the component library 415 to build code corresponding to the codified user experience design (block 535).

FIG. 6 is a flow chart of an example process of automating template and logic generation from a codified user experience design, according to some embodiments. As shown in FIG. 6, in some embodiments a pattern generator 440 is used to set an architectural flow for the software that is to be created from the codified user experience design, and then a code generator 445 is used to build the software based on the architectural flow.

In some embodiments the process of generating a front-end for based on the codified user experience design starts by retrieving the codified user experience design from the user experience design repository (block 600).

To generate the required logic that will enable the codified user experience design to interact with and be used to control operation of the intended software application, the automated template and logic generator 400 includes a pattern generator 440 configured to read the FSM of the codified user experience and, using the FSM, to specify an architectural flow for the software design (block 605).

Based on the software design pattern provided by the pattern generator 440, a code generator 445 identifies objects in the codified user experience design, and obtains corresponding components from the component library 415 of the BFF layer 410 (block 610). For example, in some embodiments the code generator matches feature names of the objects in the codified user design (block 615), and based on the feature name obtains the corresponding component from the component library 415 (block 620). In some embodiments, annotations associated with the objects are also used in connection with selection of corresponding components from the component library 415.

In some embodiments, when the aggregation engine 405 selects components from component library 420 for particular objects, the aggregation engine 405 adds an annotation to the object in the codified user experience design identifying the component that was selected as corresponding to the object. When the code generator 445 encounters the object, the code generator reads the annotation and uses the annotation to select the corresponding component from the component library 415. In this manner the aggregation engine 405 and code generator 445 are assured to consistently implement object/component correlation.

The components are then compiled according to the architectural flow (block 625). For example, in some embodiments each object has a set of properties. Example properties might include an (X,Y) location of the object in the graphical user interface (if the codified user experience is GUI based), object color, object size (e.g., small, medium, large), object responsiveness to changes in screen size, etc., (block 630). These other parameters are also possible to be viewed on HTML objects, such as color, size, responsiveness to changes in screen sizes, and other styles determined by Cascading Style Sheets. Once the correct library component has been obtained for the object (block 635), the component is built to the (X,Y) location of the HTML object (block 640). This process iterates to generate pre-compiled code required to implement the objects of the codified user experience design.

The precompiled code is then packaged with a node.js layer to enable local runtime (block 645), and the packaged precompiled code is returned to the repository (block 650). For example, the packaged precompiled code (pattern) may be output as a tagged commit on a new feature branch in Git.

Once a user experience design is created, engineers implement the underlying functionality in the software and also generate a user interface for the feature, based on the user experience design, that allows the underlying functionality to be accessed. During the process of implementing the underlying functionality and creating the user interface, changes are often required which can cause the implemented product code to depart from the intended user experience design. The differences between the intended user experience design and implemented product code can be visual or can be functional, depending on the nature of the changes. Accordingly, it is important to test the implemented product code to determine consistency with the original user experience design.

Visual testing involves comparing the visual aspects of a Graphical User Interface (GUI) of an implemented product with a GUI of an intended user experience design. Some visual testing tools provide snapshots of current code, that are stored and compared to spot pixel-by-pixel differences of every screen. These tools can be expensive and processor intensive, as hundreds or thousands of snapshots must be taken at defined time intervals and compared to identify changes to each view in a user interface. Further, these tools are used to compare snapshots of compiled code, which compares aspects that are visible in the Document Object Model (DOM) of a browser, as opposed to checking pre-compiled code.

According to some embodiments, a Back-end For Front-end (BFF) layer is created for a codified user experience design, which aggregates data from a visual prototype and dynamically creates fully-coded patterns using components from a component library. The pre-compiled code generated from a codified user experience design is used to generate a graphical user interface that is compared against a graphical user interface of the implemented product code. A differencing tool is used to compare screenshots, snippets, and patterns, to identify visual differences between the GUI of the codified user experience design and the GUI of the implemented product code.

Figure 7:
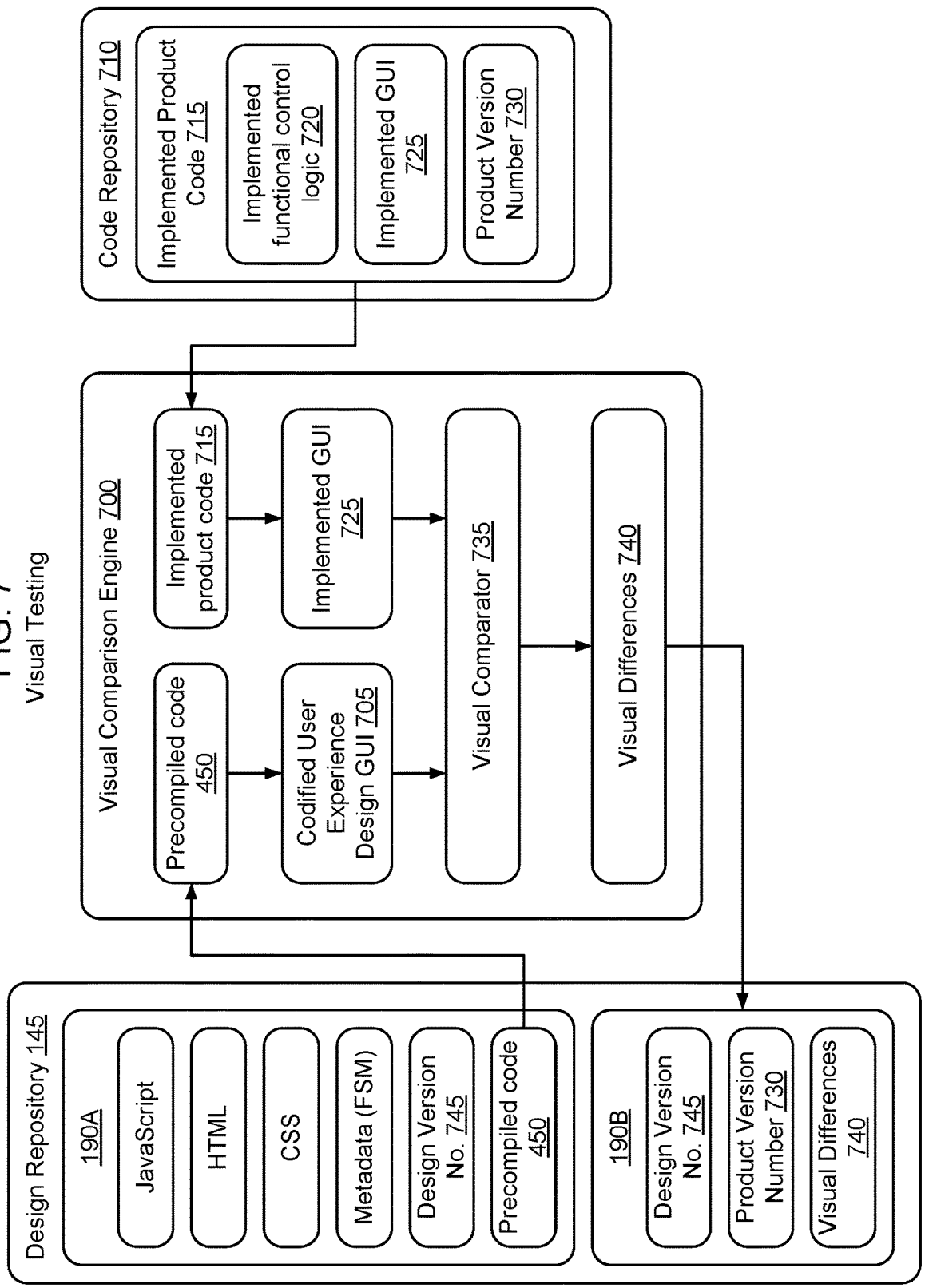
FIG. 7 is a functional block diagram of an automated visual testing system, according to some embodiments.

FIG. 7 is a functional block diagram of an automated visual testing system, according to some embodiments. As shown in FIG. 7, in some embodiments, a visual comparison engine 700 is provided that is configured to perform visual testing to compare a graphical user interface 725 of implemented product code 715 with a graphical user interface 705 that is generated from precompiled code 450 derived from a codified user experience design 190. In some embodiments, each screen generated by the GUI of the precompiled code 450 is compared with each screen produced by the GUI of the implemented product code 715 by a visual comparator 735. Any visual differences 740 are identified.

Any visual differences 740 are able to be captured and stored in the design repository 145, along with identifying information such as the design version 745 of the codified user experience design, the product version number 730 of the implemented product code 715, and information identifying the nature of the visual differences 740. Example visual differences might include different objects, different object locations, different object shapes, colors, or myriad other differences. Many types of visual differences might be determined by the visual comparator 735 and stored as visual differences 740 in the design repository 145. By identifying visual differences 740 between the GUI generated from the precompiled code and the GUI generated by the implemented code, it is possible to ascertain whether changes are required to be made to the graphical user interface of the implemented product code to cause the implemented product code to more closely match the intended user experience design.

Figure 8:
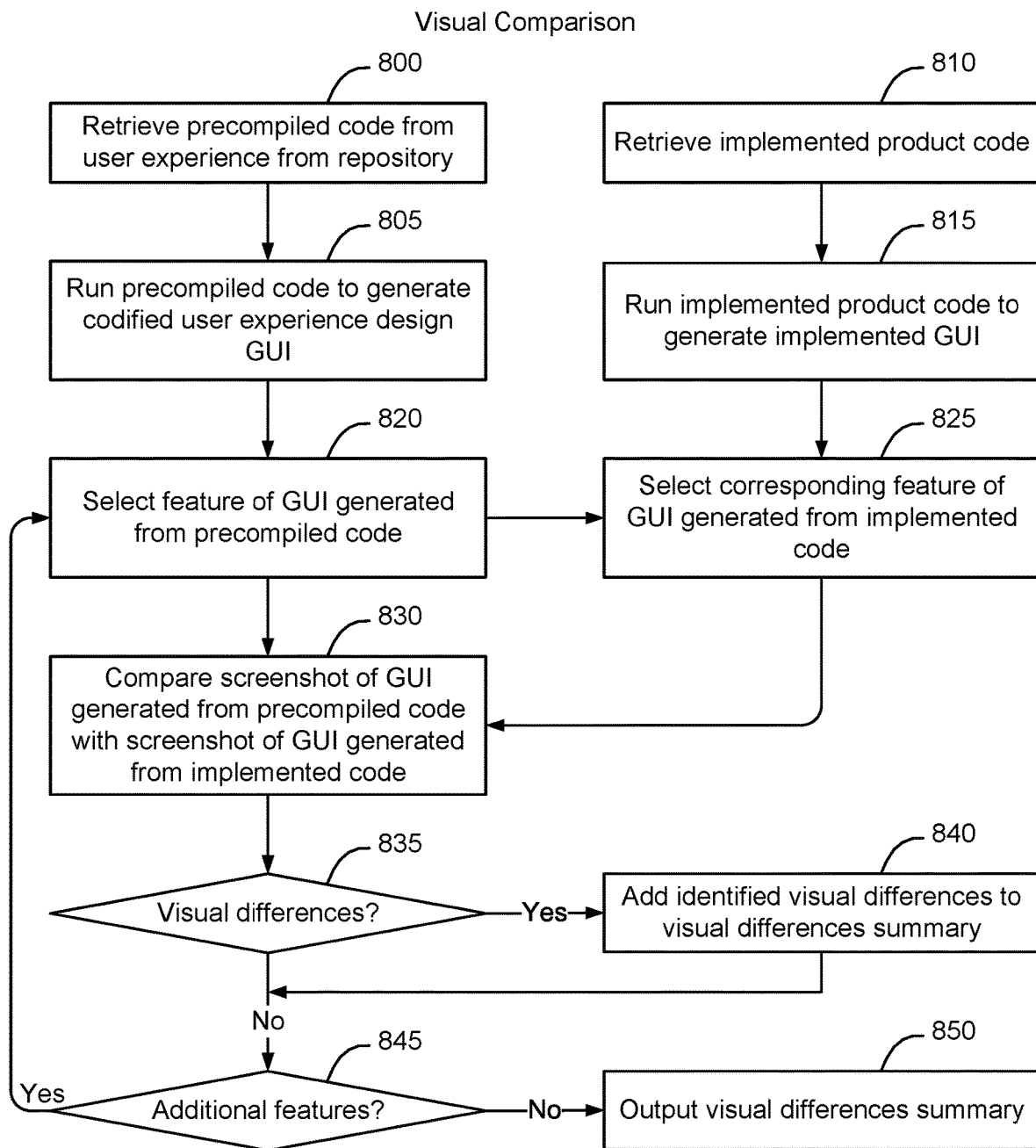
FIG. 8 is a flow chart of an example process of automating visual testing of a graphical user interface of an implemented product against an intended graphical user interface of a codified user experience design, according to some embodiments.

FIG. 8 is a flow chart of an example process of automating visual testing of a graphical user interface of implemented product code against an intended graphical user interface of a codified user experience design, according to some embodiments. As shown in FIG. 8, in some embodiments the visual comparison engine 700 retrieves a copy of the precompiled code 450 that was created from the codified user experience from the user experience design repository 145 (block 800). In some embodiments, the precompiled code 450 is generated using the process described above in connection with FIGS. 4-6. Other ways of generating precompiled code 450 might also be used, depending on the implementation. The precompiled code 450 is then executed to generate an instance of the codified user experience design GUI (block 805).

The visual comparison engine 700 also retrieves a copy of the implemented product code from the code repository (block 810). The implemented product code 725 is then executed to generate an instance of the implemented GUI (block 815).

A feature of the GUI created from the precompiled code is selected (block 820), and a corresponding feature of the GUI generated by the implemented product code is selected (block 825). The feature may be a start page, a subsequent page, a GUI page that is generated when a particular action is taken, etc.

A screenshot of the GUI display created from the precompiled code is then compared with a screenshot of the GUI display created from the implemented product code (block 830). A determination is then made if there are visual differences between the screenshot of the GUI created from the precompiled code and the screenshot of the GUI created from the implemented product code (block 835). If there are differences between the compared screenshots (a determination of YES at block 835) the identified visual differences are added to a visual differences summary (block 840). If there are no differences between the compared screenshots (a determination of NO at block 835) a determination is made if there are additional features of the GUI created from the precompiled code that should be tested (block 845).

If there are additional features to be tested (a determination of YES at block 845) the process returns to block 820 for selection of another feature to be tested. The visual testing process iterates until all features are tested (a determination of NO at block 845) at which point the visual differences summary is output (block 850). The visual differences summary contains a compilation of all aspects of the GUI of the implemented product code that were identified as being different than corresponding GUI of the precompiled code that was generated from the codified user experience design. The visual differences may then be evaluated to determine if the visual differences indicate that changes should be made to the implemented product code to cause the implemented product code to be more closely aligned with the intended user experience design.

In addition to visual testing of a graphical user interface of implemented product code, it is also necessary to test the functionality of the implemented product code. Conventionally, checking whether the implementation of an experience matches the design of the experience, as created by the experience designers, was a manual process. Checker programs, for example written in the Gherkin language, for the Cucumber behavior-driven development platform, are generally created manually, which can be a time-consuming process, particularly where the implemented product code has an extensive feature set.

According to some embodiments, the codified user experience design is used to automatically create compliance checking code to ensure that an experience implementation matches an experience design specification, for each version of the design. By automatically creating the compliance checking code, it is possible to subsequently run a compliance checking application on the implemented product code, to determine whether the implemented product code is consistent with the codified user experience design.

Figure 9:
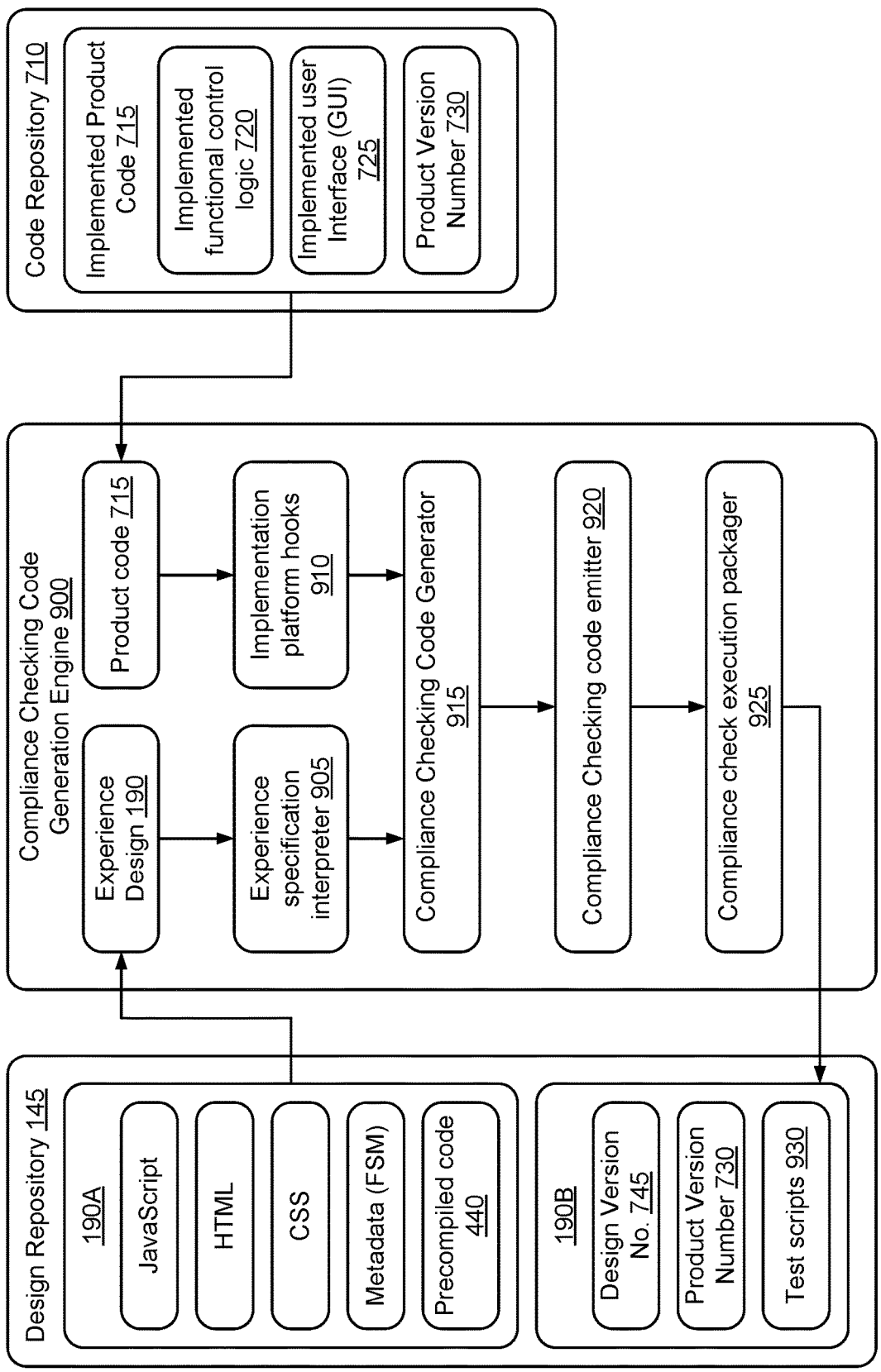
FIG. 9 is a functional block diagram of an automated compliance check code generation system configured to automate generation of compliance check code for implemented product code based on a codified user experience design, according to some embodiments.

FIG. 9 is a functional block diagram of an automated compliance check code generation system configured to automate generation of compliance check code for implemented product code based on a codified user experience design, according to some embodiments. As shown in FIG. 9, in some embodiments a compliance checking code generation engine 900 is provided that is configured to automatically generate compliance checking code that can then be used to perform compliance checks to determine whether the implemented product functionally complies with the intended objectives of the codified user experience design. For example, the compliance checking code generation engine, in some embodiments, generates compliance check code configured to determine whether the persona of the implemented product code matches the intended persona of the codified user experience design. The compliance checking code generation engine 900, in some embodiments, also generates compliance check code configured to determine whether the outcome of the implemented product code matches the intended outcome of the codified user experience design. Compliance checking code can also be generated to create a set of compliance checks directed at evaluating the implemented product code matches the finite state machine of the codified user experience design, and whether the implemented product code complies with the consistency rules and annotations of the codified user experience design.

In some embodiments, as shown in FIG. 9, the compliance checking code generation engine 900 is configured to obtain a copy of the codified user experience design 190. The codified user experience design, in this context, does not need to be used to generate precompiled code to generate the compliance checking code, but rather the codified user experience design 190 may be used to directly create a set of compliance checking scripts that should are then able to be used by a compliance checking program to determine compliance of the implemented product code with the metadata of the codified user experience design 190.

The compliance checking code generator, in some embodiments, includes an experience specification interpreter 905. The experience specification interpreter 905 is configured to extract information from the codified user experience design that will then be used to generate compliance checking code by a compliance checking code generator 915. Example information extracted by the experience specification interpreter 905 includes the persona, outcome, FSM, consistency (variability) rules, and object annotations contained in the codified user experience design 190.

The compliance checking code generation engine 900 also is configured to obtain a copy of the product code 715 and use a set of implementation platform hooks configured to read the persona and the outcome from the implemented product code. The platform hooks are also used to build a FSM from the implemented product code, extract a list of elements required for consistency checks, and object annotations from the implemented product code 715. For example, to determine the persona associated with the implemented product code, the set of implementation platform hooks 910 may look to determine authentication information required to be implemented in connection with initiating execution of the implemented product code. If the implemented product code requires an administration login, the implementation platform hooks are used to infer that the persona=admin. In connection with determining an outcome associated with the implemented product code, the implementation platform hooks might look at API calls executed by the implemented product code in connection with actions to be performed by the implemented product code. The API calls can be indicative of the outcome achieved by the implemented product code.

The compliance checking code generator uses the output of the experience specification interpreter 905 and the output of the implementation platform hooks 910 to generate intermediate blocks of compliance checking code. The compliance checking code is provided to a compliance checking code emitter 920, that converts intermediate code blocks of compliance checking code into a compliance checker program. The compliance checker program may be implemented in one of several languages, such as Gherkin language for the Cucumber behavior-driven development platform. The compliance checking code is provided to a compliance check execution packager 925, which packages the compliance checking code with a code execution order file (e.g., a Makefile), which specifies and enforces a precise execution order for the compliance checker programs. The packaged compliance checking code is then placed back into the codified user experience design repository 145. In some embodiments, the packaged compliance checking code includes test scripts 930 created by the compliance checking code emitter 920, and is annotated with the product version number 730 and the design version number 745 that were used to generate the test scripts 930. By automatically creating compliance test code, it is possible to create a set of test scripts that may subsequently be used by compliance checker program, to determine whether the functionality of the implemented product code 715 is consistent with the codified user experience design.

Figure 10:
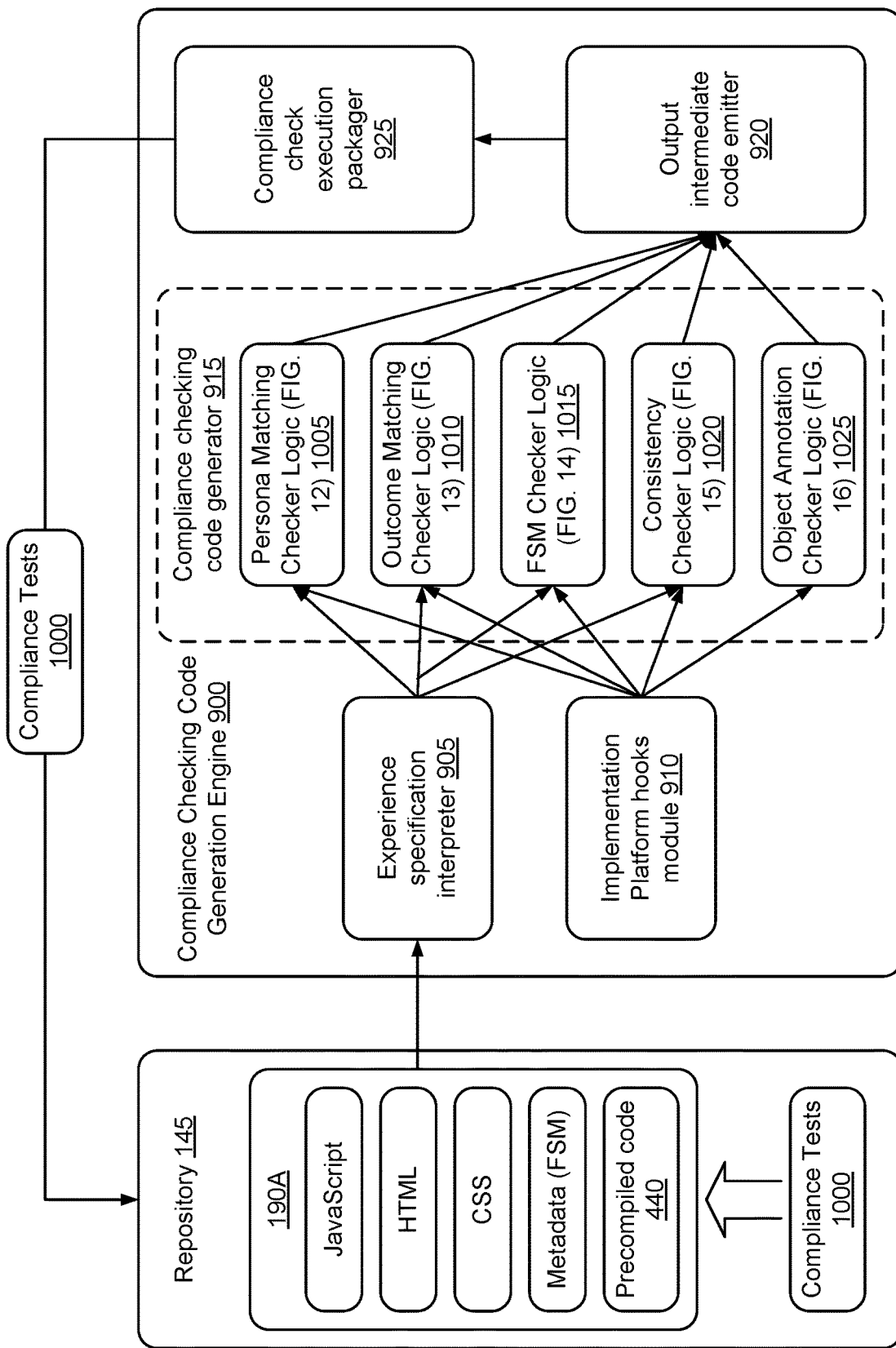
FIG. 10 is a functional block diagram of the compliance check code generation system of FIG. 9 showing the compliance check generator logic in greater detail, according to some embodiments.

FIG. 10 is a functional block diagram of the compliance check code generation system of FIG. 9 showing the compliance check generator logic in greater detail, according to some embodiments. As shown in FIG. 10, in some embodiments the compliance checking code generator 915 includes persona matching program checker logic 1005 configured to create compliance checking code that is designed to compare the implemented product with persona metadata of the codified user experience design. Additional details associated with actions performed by the persona matching program checker logic 1005 are described below in connection with FIG. 12.

In some embodiments, the compliance checking code generator 915 includes outcome matching program checker logic 1010 configured to create compliance checking code that is designed to compare the implemented product code with outcome metadata of the codified user experience design. Additional details associated with actions performed by the outcome matching program checker logic 1010 are described below in connection with FIG. 13.

In some embodiments, the compliance checking code generator 915 includes Finite State Machine (FSM) matching program checker logic 1015 configured to create compliance checking code that is designed to compare functionality of the implemented product code with the functionality of the codified user experience design, as reflected in the finite state machine (FSM) of the codified user experience design. Additional details associated with actions performed by the FSM matching program checker logic 1015 are described below in connection with FIG. 14.

In some embodiments, the compliance checking code generator 915 includes consistency checker logic 1020. As noted above, in some embodiments the codified user experience design includes consistency or variability rules associated with particular components. The variability rules allow the respective component in the implemented product code to vary somewhat from the component specified in the codified user experience design. The consistency checker logic 1020, in some embodiments, is configured to generate compliance checking code that is designed to compare components of the implemented product code with the variability parameters contained in the codified user experience design. Additional details associated with actions performed by the consistency checker logic 1020 are described below in connection with FIG. 15.

In some embodiments, the compliance checking code generator 915 includes object annotation checker logic 1025. As noted above, in some embodiments the codified user experience design includes object annotations that specify particular attributes associated with particular elements. The object annotation checker logic 1025, in some embodiments, is configured to generate compliance checking code based on the object annotations, to enable the compliance checking code to test whether the objects of the implemented product code comply with the object annotations. Additional details associated with actions performed by the object annotation checker logic 1025 are described below in connection with FIG. 16.

Figure 11:
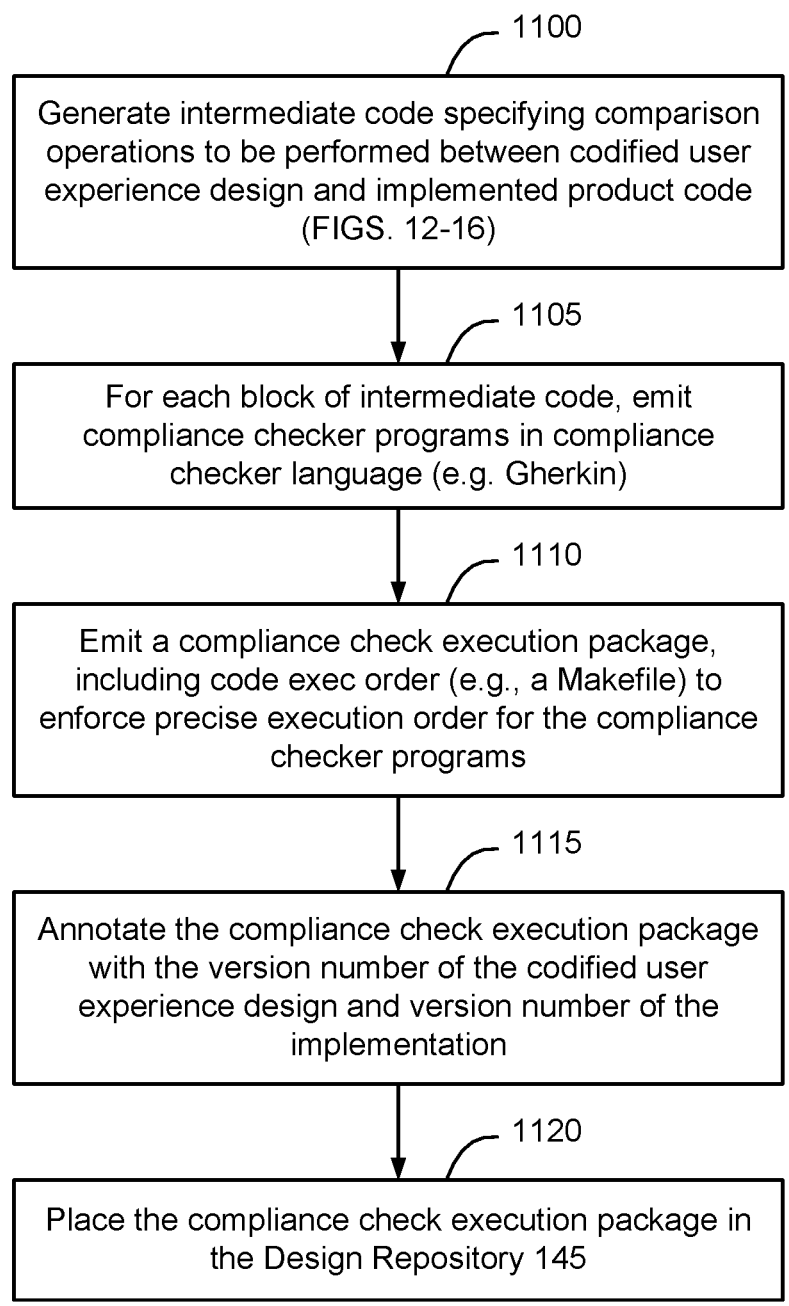
FIG. 11 is a flow chart of an overview of an example process of automated compliance checking code generation, according to some embodiments.

FIG. 11 is a flow chart of an overview of an example process of automated compliance checking code generation, according to some embodiments. As shown in FIG. 11, in some embodiments the compliance checking code generation engine 900 generates intermediate code specifying comparison operations to be performed between the codified user experience design and implemented product code (block 1100). The blocks of intermediate code are output by the logic blocks 1005, 1010, 1015, 1020, and 1025 of FIG. 10. Each block of intermediate code is used to generate a compliance checker program, using a standard compliance checker language (block 1105). The set of compliance checker programs is bundled into a package along with a file specifying an order of execution of the compliance checker programs to enable the precise order of execution of the compliance checker programs to be specified (block 1110). The compliance check execution package is then annotated with the version number of the codified user experience design and the version number of the implemented product code (block 1115), and the compliance check execution package is stored in the codified user experience design repository 145 (block 1120).

FIGS. 12-16 are flow charts that show additional details associated with actions taken by logic blocks 1005, 1010, 1015, 1020, and 1025 of FIG. 10, in connection with generating blocks of intermediate code, that are then able to be used to create a set of compliance checker programs to be used in connection with functional testing of the implemented product code 715.

Figure 12:
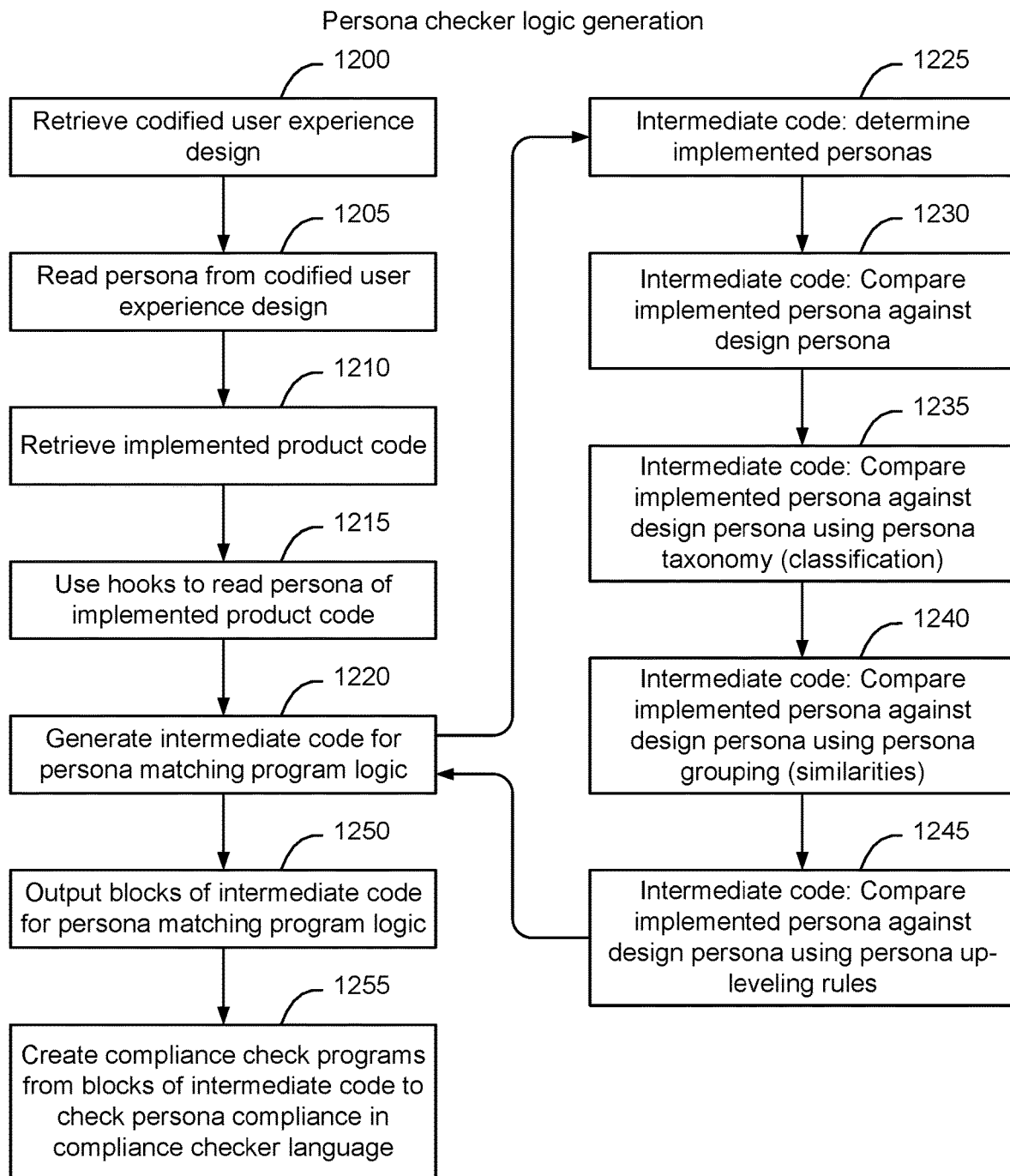
FIG. 12 is a flow chart of an example process of automated generation of compliance checking code related to determining compliance of implemented product code with a persona specified by a codified user experience design, according to some embodiments.

FIG. 12 is a flow chart of an example process of automated generation of compliance checking code related to determining compliance of implemented product code with a persona specified by a codified user experience design, for example by persona matching program checker logic 1005, according to some embodiments. As shown in FIG. 12, in some embodiments the persona matching program checker logic 1005 retrieves the codified user experience design (block 1200) and reads the persona from the codified user experience design (block 1205). The persona matching program checker logic 1005 also retrieves the implemented product code (block 1210) and uses hooks to determine, from the implemented product code, the intended persona or set of intended personas that are able to use the implemented product code (block 1215). Example hooks that may be used to determine the intended persona of the implemented product code might be associated with determining login privilege level required to access the implemented product code. Alternatively, comments associated with the implemented product code might specify the persona or other information that may be used to derive the persona associated with the implemented product code.

Intermediate code blocks are then generated for the persona matching program checker logic (block 1220). In particular, in some embodiments a first set of intermediate code blocks are based on determining the implemented personas of both the codified user experience design and the implemented product code (block 1225). A second set of intermediate code blocks are based on comparing the persona of the implemented product code with the persona of the codified user experience design (block 1230).

A third set of intermediate code blocks are based on comparing the persona of the implemented product code with a taxonomy (classification) of personas, to determine if the implemented persona is in the same classification of personas as the persona of the codified user experience design (block 1235).

A fourth set of intermediate code blocks are based on comparing the persona of the implemented product code with persona groupings, to determine if the implemented persona is in the same group (e.g., similar to) the persona of the codified user experience design (block 1240).

A fifth set of intermediate code blocks are based on comparing the persona of the implemented product code with persona upleveling rules (block 1245). Upleveling rules might specify, for example, that an administrative user is able to access all features, whereas an ordinary user would have access to fewer features. An upleveling rule, in this context, might be that a user experience design having a persona=ordinary user would be satisfied by an implemented product having persona=admin, because an admin user will be able to access all features that an ordinary user would be able to access. By contrast, a codified user experience design with a persona=admin would not be satisfied by an implemented product having a persona=ordinary user.

The intermediate code generated in blocks 1225, 1230, 1235, 1240, and 1245, specifies a set of test scripts that should be implemented in compliance checking code to compare the persona of the implemented product code with the persona of the codified user experience design. The blocks of intermediate code are output (block 1250) and used to create a set of compliance check programs (block 1255), for example written in the Gherkin language. As noted above, these compliance check programs are then packaged and added to the codified user experience design repository 145.

Figure 13:
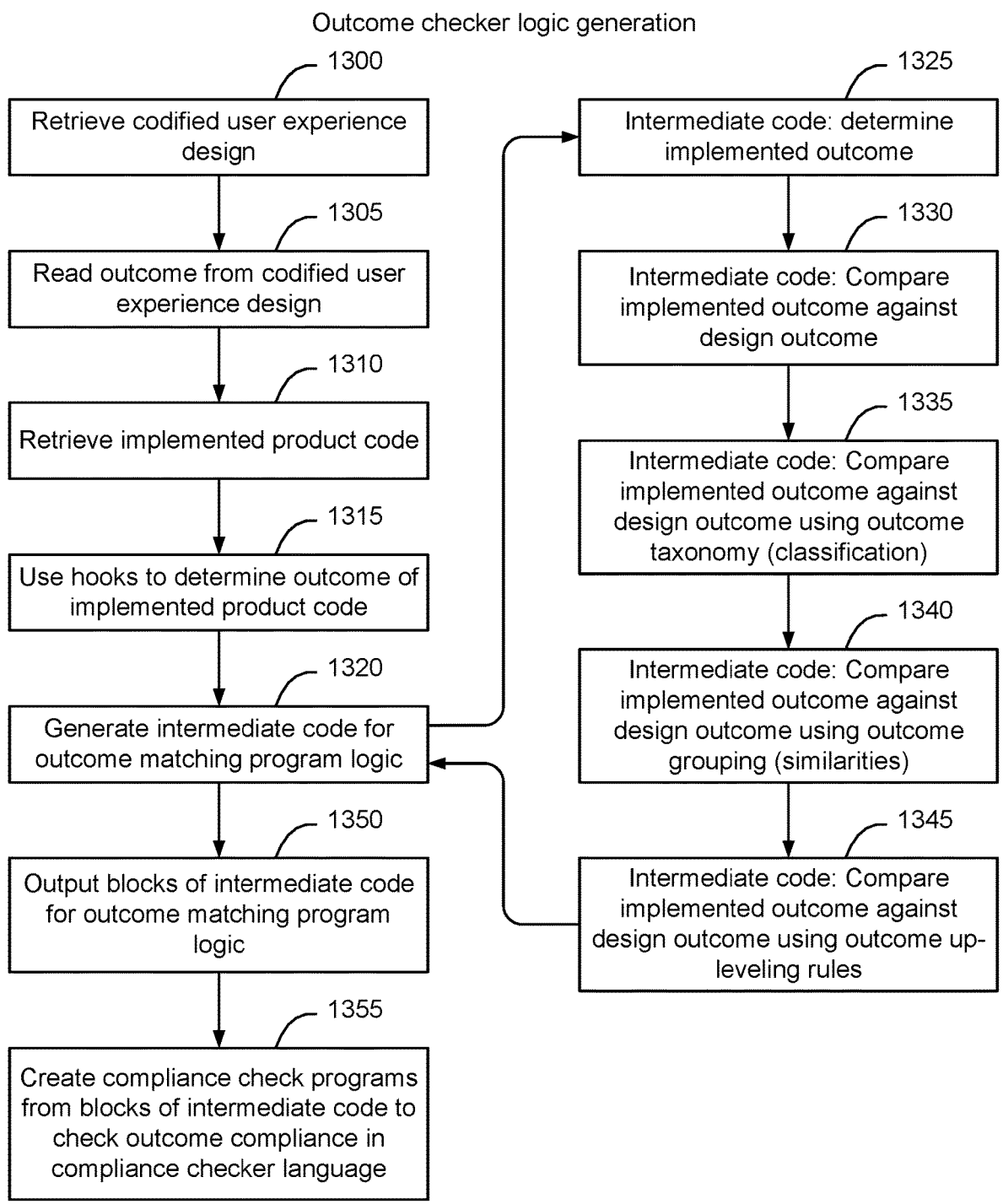
FIG. 13 is a flow chart of an example process of automated generation of compliance checking code related to compliance of implemented product code with an outcome specified by a codified user experience design, according to some embodiments.

FIG. 13 is a flow chart of an example process of automated generation of compliance checking code related to compliance of implemented product code with an outcome specified by a codified user experience design, for example by outcome matching program checker logic 1010, according to some embodiments. As shown in FIG. 13, in some embodiments the outcome matching program checker logic 1010 retrieves the codified user experience design (block 1300) and reads the outcome from the codified user experience design (block 1305). The outcome matching program checker logic 1010 also retrieves the implemented functional product code (block 1310) and uses hooks to determine, from the implemented functional product code, the intended actions that may be used to infer an intended outcome or set of intended outcomes of the implemented product code (block 1315). In some embodiments, the implemented product code contains a set of API calls that are used to access functions exposed by an underlying software system. The functions associated with the API calls are used, in some embodiments, to determine a set of intended outcomes of the implemented product code. Other ways of determining the intended outcome of the implemented product code may be used as well. For example, in some instances the intended outcome of the implemented product code may be contained in comments that are written into the implemented product code.

Intermediate code blocks are then generated for the outcome matching program checker logic 1010 (block 1320). In particular, in some embodiments a first set of intermediate code blocks are based on determining the implemented outcomes of both the codified user experience design and the implemented product code (block 1325). A second set of intermediate code blocks are based on comparing the outcome of the implemented product code with the outcome of the codified user experience design (block 1330).

A third set of intermediate code blocks are based on comparing the outcome of the implemented product code with a taxonomy (classification) of outcomes, to determine if the implemented outcome is in the same classification of outcomes as the outcome of the codified user experience design (block 1335).

A fourth set of intermediate code blocks are based on comparing the outcome of the implemented product code with outcome groupings, to determine if the implemented outcome is in the same group (e.g., similar to) the outcome of the codified user experience design (block 1340).

A fifth set of intermediate code blocks are based on comparing the outcome of the implemented product code with outcome upleveling rules (block 1345). Upleveling rules might specify, for example, that a lower-level outcome can be part of a software program that incorporates that lower-level outcome as a step in achieving a higher-level outcome. For example, a user experience design with an outcome intended to provide a single sign-on function might be incorporated in an implemented product that requires both the single sign-on function and then also incorporates additional functionality. Multiple upleveling rules might be used to generate intermediate code specifying checking code that should be used to compare the outcome of the implemented product code with the outcome of the codified user experience design.

The intermediate code generated in blocks 1325, 1330, 1335, 1340, and 1345, specify a script of tests that should be implemented in compliance checking code to compare the outcome of the implemented product code with the outcome of the codified user experience design. The blocks of intermediate code are output (block 1350) and used to create a set of compliance check programs (block 1355). As noted above, these compliance check programs are then packaged and added to the codified user experience design repository 145.

Figure 14:
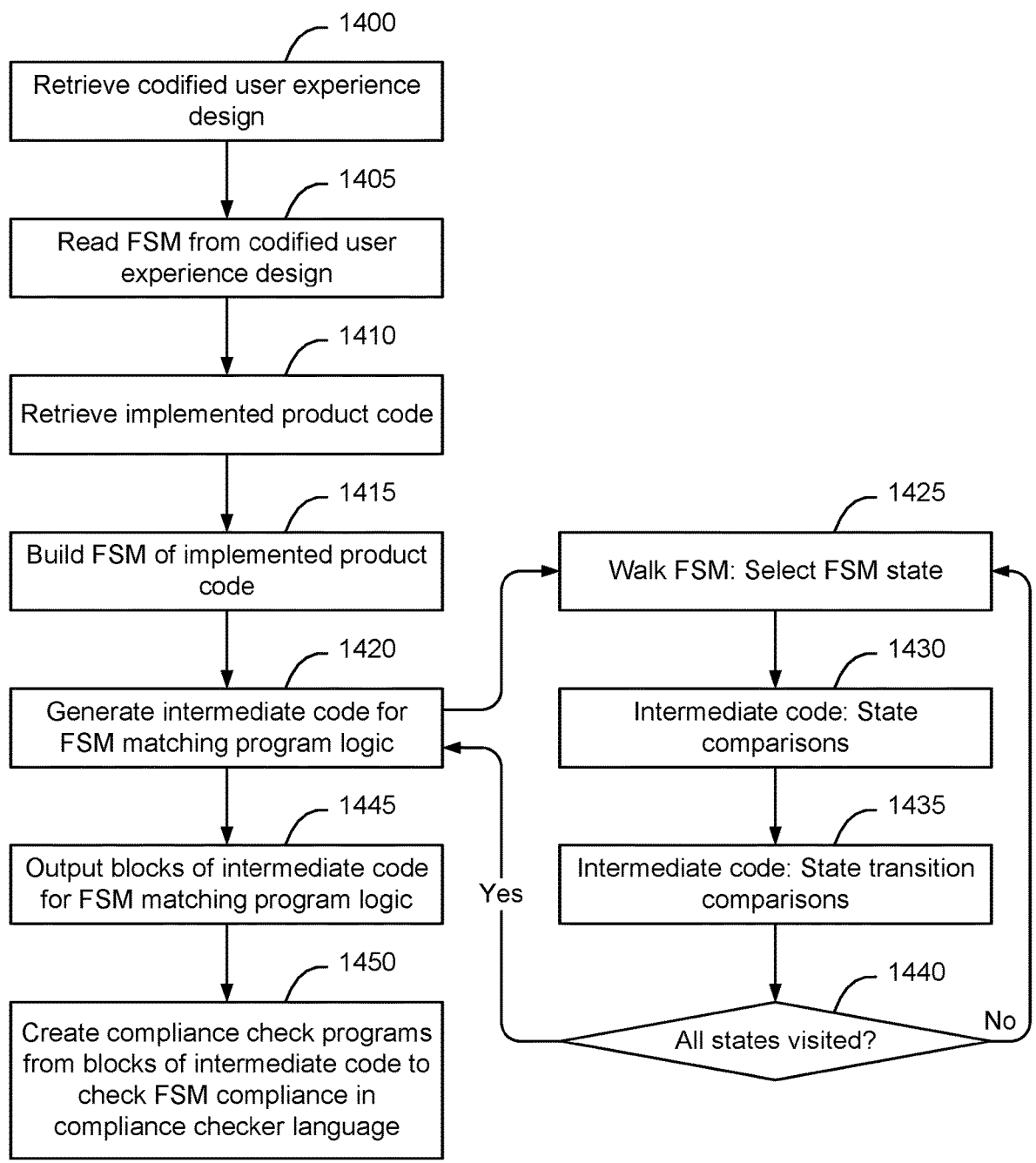
FIG. 14 is a flow chart of an example process of automated generation of compliance checking code related to compliance of functionality of implemented product code with functionality specified by a codified user experience design, according to some embodiments.

FIG. 14 is a flow chart of an example process of automated generation of compliance checking code related to compliance of functionality of implemented product code with functionality specified by a codified user experience design, for example by FSM checker logic 1015, according to some embodiments. The codified user experience design contains a Finite State Machine (FSM) that was created based on the states and the transitions between states designed into the codified user experience design. The FSM checker logic 1015, in some embodiments, creates an FSM for the implemented product code based on the states and transitions between states of the implemented product code 715, and generates intermediate code blocks designed to specify checker rules to be used to compare the FSM of the implemented product with the FSM of the codified user experience design.

As shown in FIG. 14, in some embodiments the FSM checker logic 1015 retrieves the codified user experience design (block 1400) and reads the FSM from the codified user experience design (block 1405). The FSM checker logic 1015 also retrieves the implemented functional product code (block 1410) and builds a FSM of the implemented product code (block 1415). In some embodiments, building a FSM of the implemented product code involves walking the implemented product code to determine states and transitions between states, to incrementally build the FSM of the implemented product code.

Intermediate code blocks for the FSM matching program logic 1015 are then built (block 1420). In some embodiments, intermediate code blocks are built by waking the FSM of the codified user experience design and selecting a state (block 1425). Based on that state, one or more blocks of intermediate code are created to identify tests to be performed to compare the selected state with states of the FSM of the implemented product (block 1430). Example tests might include, for example, whether the same state exists in both FSMs, whether the same state exists in the same location in both FSMs, whether the same state in both FSMs allows the same input, and numerous other tests. Additionally, based on that state, one or more blocks of intermediate code are created to identify tests to be performed to compare state transitions associated with the selected state with states transitions of the FSM of the implemented product (block 1435). Example state transitions might include comparisons of state transitions in the two FSMs that lead to the state, comparisons of state transitions in the two FSMs that lead from the state to other states, etc.

Once the state and state transitions for a given FSM state have been processed to determine checking code that should be created to evaluate the implemented product code, a determination is made as to whether all states of the FSM of the codified user experience design have been visited (block 1440). If all states of the FSM have not been visited (a determination of NO at block 1440), the process returns to block 1425 where another state of the FSM of the codified user experience design is selected. The process of blocks 1425, 1430, 1435, and 1440 iterates until all states of the FSM of the codified user experience design have been visited (a determination of YES at block 1440).

The intermediate code generated in blocks 1430 and 1435 specifies a script of tests that should be implemented in compliance checking code to compare the functionality of the implemented product code with the functionality of the codified user experience design. The blocks of intermediate code are output (block 1445) and used to create a set of compliance check programs (block 1450). As noted above, these compliance check programs are then packaged and added to the codified user experience design repository 145.

Figure 15:
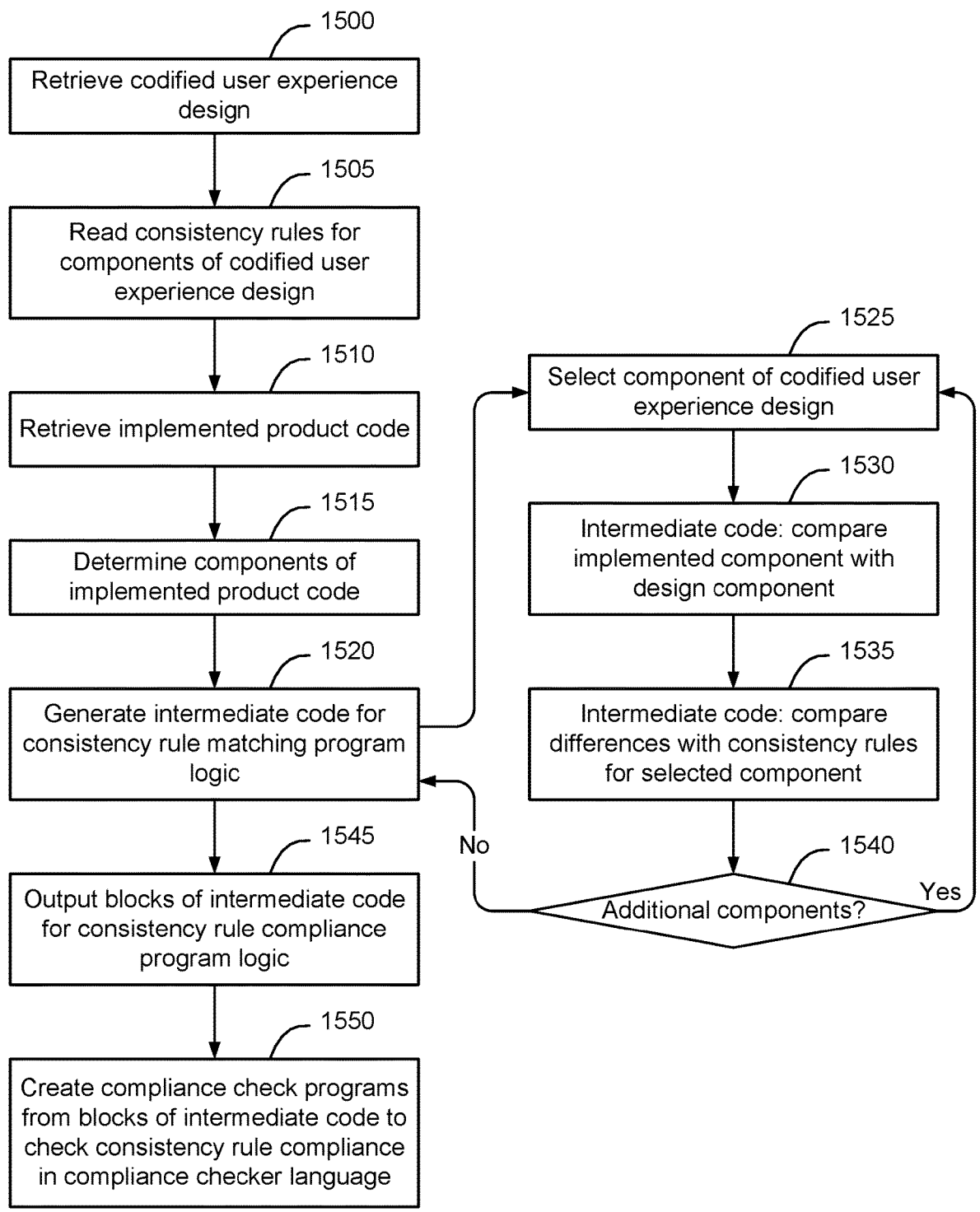
FIG. 15 is a flow chart of an example process of automated generation of compliance checking code related to compliance of components of implemented product code with consistency rules specified by a codified user experience design, according to some embodiments.

FIG. 15 is a flow chart of an example process of automated generation of compliance checking code related to compliance of components of implemented product code with consistency rules specified by a codified user experience design, for example by consistency checker logic 1020, according to some embodiments. The codified user experience design, in some instances, identifies components 240, and variability information (V) associated with the components. In some embodiments, the consistency checker logic 1020 creates intermediate code specifying component level checks to be used to determine whether components of the implemented product code are the same as the components specified in the codified user experience design. The consistency checker logic 1020 uses the variability information (V) and creates intermediate code specifying component level checks to be used to determine whether components of the implemented product code comply with the variability information (V) specified in the codified user experience design.

As shown in FIG. 15, in some embodiments the consistency checker logic 1020 retrieves the codified user experience design (block 1500) and reads the components and component variability information (consistency rules) from the codified user experience design (block 1505). The consistency checker logic 1020 also retrieves the implemented functional product code (block 1510) and determines the components contained in the implemented product code (block 1515).

Intermediate code blocks for the consistency rule matching program logic are then built (block 1520). In some embodiments, intermediate code blocks are built by selecting a component of the codified user experience design (block 1525). In particular, in some embodiments a first set of intermediate code blocks are based on comparing implemented components with the selected component, to determine if the implemented product code contains a corresponding component (block 1530). A second set of intermediate code blocks are based on comparing differences between the selected component and the corresponding component in the implemented product code, to determine if the differences are within the variability specified in the consistency rules for the selected component (block 1535).

Once the intermediate code blocks have been built for the selected component, a determination is made as to whether there are additional components of the codified user experience design (block 1540). If there are additional components (a determination of YES at block 1540), the process returns to block 1525 where another component is selected. The process (blocks 1525, 1530, 1535, 1540) iterates until all components have been processed. Optionally, additional intermediate blocks of code may be built to check for the presence of any components in implemented product code that do not have a corresponding component in the codified user experience design.

The intermediate code generated in blocks 1530 and 1535 specifies a script of tests that should be implemented in compliance checking code to compare the components of the implemented product code with the components and component variabilities of the codified user experience design. The blocks of intermediate code are output (block 1545) and used to create a set of compliance check programs (block 1550). As noted above, these compliance check programs are then packaged and added to the codified user experience design repository 145.

FIG. 16 is a flow chart of an example process of automated generation of compliance checking code related to compliance of implemented product code with annotations specified by a codified user experience design, for example by object annotation checker logic 1025, according to some embodiments. In some instances, the codified user experience design contains annotations, for example specifying particular properties of components, component styles, or other aspects of the design that should be included in the implemented product code.

As shown in FIG. 16, in some embodiments the annotation checker logic 1025 retrieves the codified user experience design (block 1600) and reads the annotations from the codified user experience design (block 1605). The annotation checker logic 1025 also retrieves the implemented functional product code (block 1610) and determines components of the implemented product code (block 1615).

The annotation checker logic 1025 then generates intermediate code to enable creation of compliance checking code that will check the implemented product code for compliance with the annotations of the codified user experience design (block 1620). In some embodiments, an annotation of the codified user experience design is selected (block 1625). A first block of intermediate code is then created based on determining components of the implemented product that are associated with the annotation (block 1630). A second block of intermediate code is created based on comparing the identified components for compliance with the annotations (block 1630). For example, if the annotation specified a particular shape/style of the component in the codified user experience design, intermediate code would be created to identify a compliance check that needs to be created to specify that the compliance checking logic should determine the shape/style of the component in the implemented product code and compare the shape/style of the implemented component with the shape/style specified in the annotation.

Once the intermediate code blocks have been built for the selected annotation, a determination is made as to whether there are additional annotations of the codified user experience design (block 1640). If there are additional annotations (a determination of YES at block 1640), the process returns to block 1625 where another annotation is selected. The process (blocks 1625, 1630, 1635, 1640) iterates until all annotations have been processed.

The intermediate code generated in blocks 1630 and 1635 specifies a script of tests that should be implemented in compliance checking code to determine if the components of the implemented product code are consistent with the annotations of the codified user experience design. The blocks of intermediate code are output (block 1645) and used to create a set of compliance check programs (block 1650). As noted above, these compliance check programs are then packaged and added to the codified user experience design repository 145.

The compliance checking code generation engine generates an entire set of compliance checks that are then able to be run using compliance check software to determine compliance of the implemented product code 715 with the codified user experience design. It should be emphasized that the compliance checking code generation engine 900 is not actually performing any compliance checks. Rather, the compliance checking code generation engine 900 generates scripts of tests that can be used by a compliance check software platform to perform compliance checking on the implemented product code. Conventionally, compliance checking code has been manually scripted, by having a quality engineer produce a set of tests to be run against the implemented product code to test aspects of the implemented product code against an intended experience design. By automating creation of the test scripts, it is possible to automatically generate a set of test scripts every time the implemented product code changes, to thereby implement testing of the implemented product code during development as well as once development of the code has been finalized. The ability to test during the development cycle enables aspects of the implemented product code to be incrementally developed and tested for compliance with the codified user experience design, rather than waiting until the end of the development cycle.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, subsystems, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of generating compliance checking code to test an implemented product code for compliance with a codified user experience design, comprising:
   retrieving the codified user experience design;
   extracting persona metadata and outcome metadata from the codified user experience design;
   retrieving the implemented product code;
   extracting, using hooks, persona features and outcome features of the implemented product code;
   generating a first set of blocks of intermediate code based on comparisons between the extracted persona features of the implemented product code and persona metadata of the codified user experience design;

generating a second set of blocks of intermediate code based on comparisons between the outcome features of the implemented product code and outcome metadata of the codified user experience design;

generating, using the first set of blocks of intermediate code and second set of blocks of intermediate code, a set of test scripts written using a compliance checking code language;

storing the set of test scripts written using the compliance checking code language for subsequent use by a compliance checking application; and enabling the compliance checking application to test the implemented product code for compliance by comparing the persona features and outcome features of the implemented product with the persona metadata and outcome metadata of the codified user experience.

2. The method of claim 1, wherein the first set of blocks of intermediate code comprises first intermediate code blocks based on determining a persona of the implemented product code and based on determining a persona of the codified user experience design.

3. The method of claim 2, wherein the first set of blocks of intermediate code comprises second intermediate code blocks based on comparing the determined persona of the implemented product code with the persona of the codified user experience design.

4. The method of claim 3, wherein the first set of blocks of intermediate code comprises third intermediate code blocks based on comparing the determined persona of the implemented product code with a taxonomy of personas, to determine if the persona of the implemented product code is in a same classification as the persona of the codified user experience design.

5. The method of claim 4, wherein the first set of blocks of intermediate code comprises fourth intermediate code blocks based on comparing the determined persona of the implemented product code with persona groupings, to determine if the persona of the implemented product code is similar to the persona of the codified user experience design.

6. The method of claim 5, wherein the first set of blocks of intermediate code comprises fifth intermediate code blocks based on comparing the determined persona of the implemented product code with persona upleveling rules, to determine if the persona of the implemented product code has access privileges that incorporate access privileges of the persona of the codified user experience design.

7. The method of claim 1, wherein the step of extracting, using the hooks, the persona features from the implemented product code comprises determining a login privilege level required to access the implemented product code.

8. The method of claim 1, wherein the second set of blocks of intermediate code comprises first intermediate code blocks based on determining an outcome of the implemented product code and based on determining an outcome of the codified user experience design.

9. The method of claim 8, wherein the second set of blocks of intermediate code comprises second intermediate code blocks based on comparing the determined outcome of the implemented product code with the outcome of the codified user experience design.

10. The method of claim 9, wherein the second set of blocks of intermediate code comprises third intermediate code blocks based on comparing the determined outcome of the implemented product code with a taxonomy of outcome, to determine if the outcome of the implemented product code is in a same classification as the outcome of the codified user experience design.

11. The method of claim 10, wherein the second set of blocks of intermediate code comprises fourth intermediate code blocks based on comparing the determined outcome of the implemented product code with outcome groupings, to determine if the outcome of the implemented product code is similar to the outcome of the codified user experience design.

12. The method of claim 11, wherein the second set of blocks of intermediate code comprises fifth intermediate code blocks based on comparing the determined outcome of the implemented product code with outcome upleveling rules, to determine if the outcome of the implemented product code is implemented as a lower-level outcome that is implemented as a step in achieving a higher-level outcome by the implemented product code.

13. The method of claim 1, wherein the step of using hooks to extract the outcome features from the implemented product code comprises determining a set of application programming interface (API) calls contained in the implemented product code, and determining a set of functions performed by the set of API calls.

14. The method of claim 13, wherein the step of extracting, using the hooks, the outcome features from the implemented product code further comprises parsing comments contained in the implemented product code.

15. The method of claim 1, further comprising extracting a first finite state machine (FSM) from the codified user experience design; building a second finite state machine from the implemented product code; and generating a third set of blocks of intermediate code based on comparisons between the first finite state machine and the second finite state machine.

16. The method of claim 15, wherein building the second finite state machine from the implemented product code comprises walking the implemented product code to determine states of the implemented product code and transitions between states of the implemented product code.

17. The method of claim 15, wherein the third set of blocks of intermediate code comprises state tests to be performed to compare selected states of the first finite state machine from the codified user experience design with states of the second finite state machine from the implemented product code.

18. The method of claim 17, wherein the state tests comprise first state tests comparing whether the same state exists in both FSMs, second state tests comparing whether the same state exists in the same location in both FSMs, and third state tests comparing whether the same state in both FSMs allows the same input.

19. The method of claim 15, wherein the third set of blocks of intermediate code comprises state transition tests to be performed to compare selected state transitions of the first finite state machine from the codified user experience design with state transitions of the second finite state machine from the implemented product code.

20. The method of claim 19, wherein the state transition tests comprise first state transition tests comparing whether the same state transitions exists in both FSMs, second state transition tests comparing whether the same state transitions in both FSMs lead to the same subsequent state, and whether the same state transitions in both FSMs lead from the same original state.

* * * * *